United States Patent
Grip et al.

(10) Patent No.: US 10,640,221 B2
(45) Date of Patent: May 5, 2020

(54) WING AIRFOIL STIFFENING FOR SOLAR POWERED AIRCRAFT

(71) Applicant: The Boeing Company, Chicago, IL (US)

(72) Inventors: Robert Erik Grip, Rancho Palos Verdes, CA (US); Aaron J. Kutzmann, Long Beach, CA (US); Blaine Knight Rawdon, San Pedro, CA (US)

(73) Assignee: THE BOEING COMPANY, Chicago, IL (US)

( * ) Notice: Subject to any disclaimer, the term of this patent is extended or adjusted under 35 U.S.C. 154(b) by 41 days.

(21) Appl. No.: 14/571,170

(22) Filed: Dec. 15, 2014

(65) Prior Publication Data

US 2016/0167764 A1   Jun. 16, 2016

(51) Int. Cl.
  *B64C 3/22* (2006.01)
  *B64D 27/24* (2006.01)
  *B64C 3/18* (2006.01)
  *B64C 3/26* (2006.01)

(52) U.S. Cl.
  CPC ............... *B64D 27/24* (2013.01); *B64C 3/18* (2013.01); *B64C 3/182* (2013.01); *B64C 3/185* (2013.01); *B64C 3/187* (2013.01); *B64C 3/22* (2013.01); *B64C 3/26* (2013.01); *B64D 2211/00* (2013.01); *Y02T 50/44* (2013.01); *Y02T 50/55* (2018.05); *Y02T 50/62* (2013.01); *Y02T 50/64* (2013.01); *Y10T 156/10* (2015.01)

(58) Field of Classification Search
  CPC .. B64C 3/22; B64C 3/18; B64C 3/182; B64C 3/185; B64C 3/187; B64C 3/26; B64C 3/44; B64C 1/064; B64C 3/10; B64C 3/48; B64C 3/00; B64D 27/24; B64D 2211/00
  See application file for complete search history.

(56) References Cited

U.S. PATENT DOCUMENTS

| | | | | |
|---|---|---|---|---|
| 1,343,707 A | | 6/1920 | Carns | |
| 1,363,127 A | * | 12/1920 | King | B64C 3/185 |
| | | | | 244/123.4 |
| 1,545,129 A | * | 7/1925 | Cook, Jr. | B64C 3/00 |
| | | | | 244/123.4 |

(Continued)

FOREIGN PATENT DOCUMENTS

| | | | | |
|---|---|---|---|---|
| GB | 229345 A | * | 7/1925 | B64C 3/00 |
| GB | 352286 A | * | 7/1931 | B64C 3/00 |

OTHER PUBLICATIONS

"Solar Flight News"; Solar Flight; http://solar-flight.com/; accessed Feb. 26, 2015; 1 page.

(Continued)

*Primary Examiner* — Christopher D Hutchens
(74) *Attorney, Agent, or Firm* — Gates & Cooper LLP

(57) ABSTRACT

A light-weight stiffened wing airfoil includes at least one wing segment (52). The wing segment comprises an upper (53b) and a lower skin assembly (53a), wherein each of the upper and lower skin assemblies incorporates a plurality of inwardly facing stringers (74); a first rib (64-1) at a distal end of the wing segment and a second rib (64-2) at a proximal end of the wing segment; a plurality of rib trusses (70) extending from the first and second ribs to the opposing skin assembly (53); and a plurality of support members extending from the inwardly facing stringers to the opposing skin assembly.

16 Claims, 21 Drawing Sheets

(56) References Cited

U.S. PATENT DOCUMENTS

| | | | |
|---|---|---|---|
| 1,548,403 A | | 8/1925 | Wylie |
| 1,555,409 A | * | 9/1925 | Gilmore ............... B64C 3/00 236/92 R |
| 1,760,386 A | | 5/1930 | Vliet |
| 1,765,791 A | | 6/1930 | Fokker |
| 1,766,107 A | * | 6/1930 | Cook, Jr. ............... B64C 3/48 244/214 |
| 1,772,206 A | * | 8/1930 | Chorlton ............... B64C 3/18 244/123.8 |
| 1,781,159 A | * | 11/1930 | Carns ............... B64C 3/00 244/123.8 |
| 1,790,715 A | * | 2/1931 | Mazzini ............... B64C 3/00 244/123.8 |
| 1,806,010 A | * | 5/1931 | Williams ............... B64C 3/185 52/653.1 |
| 1,827,181 A | * | 10/1931 | Alfaro ............... B64C 3/00 244/117 R |
| 1,829,922 A | * | 11/1931 | Carns ............... B64C 3/00 244/123.4 |
| 2,116,953 A | * | 5/1938 | Sambraus ............... B64C 3/00 244/117 R |
| 2,194,483 A | * | 3/1940 | Schmidt ............... B64C 3/26 244/132 |
| 2,400,649 A | | 5/1946 | Larsen |
| 2,749,061 A | | 6/1956 | Franz |
| 2,981,337 A | | 4/1961 | Stuart |
| 3,013,614 A | | 12/1961 | Platt |
| 3,249,327 A | * | 5/1966 | Smith, Jr. ............... B64C 3/00 114/102.29 |
| 3,756,541 A | | 9/1973 | Orazi |
| 4,739,954 A | | 4/1988 | Hamilton |
| 5,165,627 A | * | 11/1992 | Amano ............... B64C 1/40 244/119 |
| 6,010,098 A | * | 1/2000 | Campanile ............... B64C 3/48 244/219 |
| 6,644,599 B2 | | 11/2003 | Perez |
| 6,766,984 B1 | * | 7/2004 | Ochoa ............... B64C 1/12 244/119 |
| 8,128,025 B2 | | 3/2012 | Rawdon et al. |
| 8,540,189 B2 | * | 9/2013 | Ayme ............... B64C 1/406 244/119 |
| 9,016,628 B2 | * | 4/2015 | Christenson ............... B64C 1/064 244/117 R |
| 2006/0261213 A1 | * | 11/2006 | Lavan ............... B64B 1/14 244/30 |
| 2008/0245927 A1 | * | 10/2008 | Kulesha ............... B64C 3/187 244/123.1 |
| 2010/0006708 A1 | * | 1/2010 | Law ............... B64C 3/18 244/219 |
| 2010/0170995 A1 | * | 7/2010 | Maenz ............... B64C 1/26 244/131 |
| 2010/0224734 A1 | * | 9/2010 | Grip ............... B64C 9/16 244/219 |
| 2010/0252681 A1 | * | 10/2010 | Grillos ............... B64C 1/12 244/119 |
| 2010/0308161 A1 | * | 12/2010 | Kendall ............... B64C 3/42 244/47 |
| 2011/0017876 A1 | | 1/2011 | Manley et al. |
| 2013/0104966 A1 | * | 5/2013 | Grip ............... H02S 10/40 136/251 |
| 2013/0240671 A1 | | 9/2013 | Kruse et al. |

OTHER PUBLICATIONS

European Application No. 13154386.0; Extended Search Report; dated Jul. 14, 2014; 2 pages.
U.S. Appl. No. 13/419,791; Office Action; dated Jul. 31, 2014; 5 pages.
"List of human-powered aircraft,"; Wikipedia; http://en.wikipedia.org/wiki/list_of_human-powered_aircraft; accessed Nov. 19, 2014; 13 pages.
"Gossamer Penguin,"; Wikipedia; http://en.wikipedia.org/wiki/Gossamer_Penguin; Nov. 19, 2014; 2 pages.
"AeroVironment,"; Wikipedia; http://en.wikipedia.org/wiki/AeroVironment; accessed Nov. 20, 2014; 4 pages.
"UAS Advanced Development: Solar Challenger,"; AeroVironment, Inc.; UAS Advanced Development Center; http://www.avinc.com/uas/ads/solar_challenger; accessed Nov. 20, 2014; 1 page.

* cited by examiner

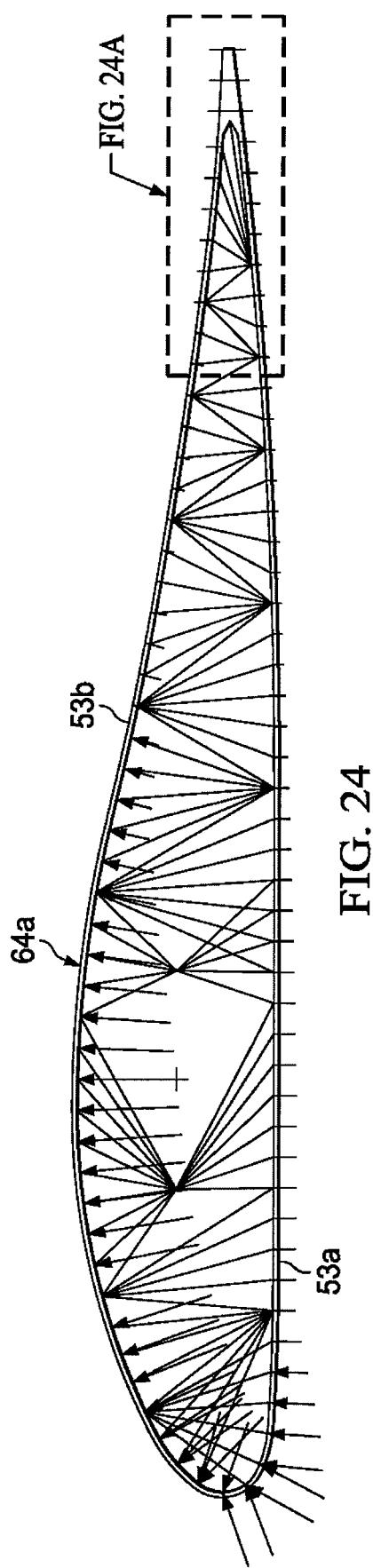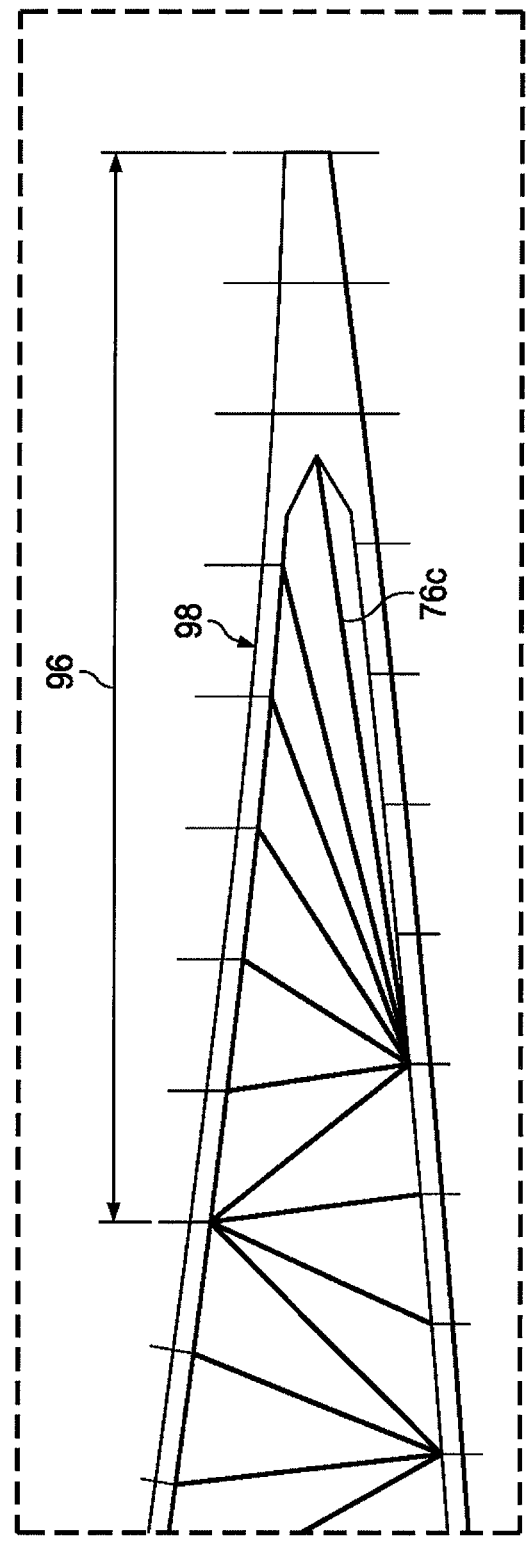
FIG. 24
FIG. 24A

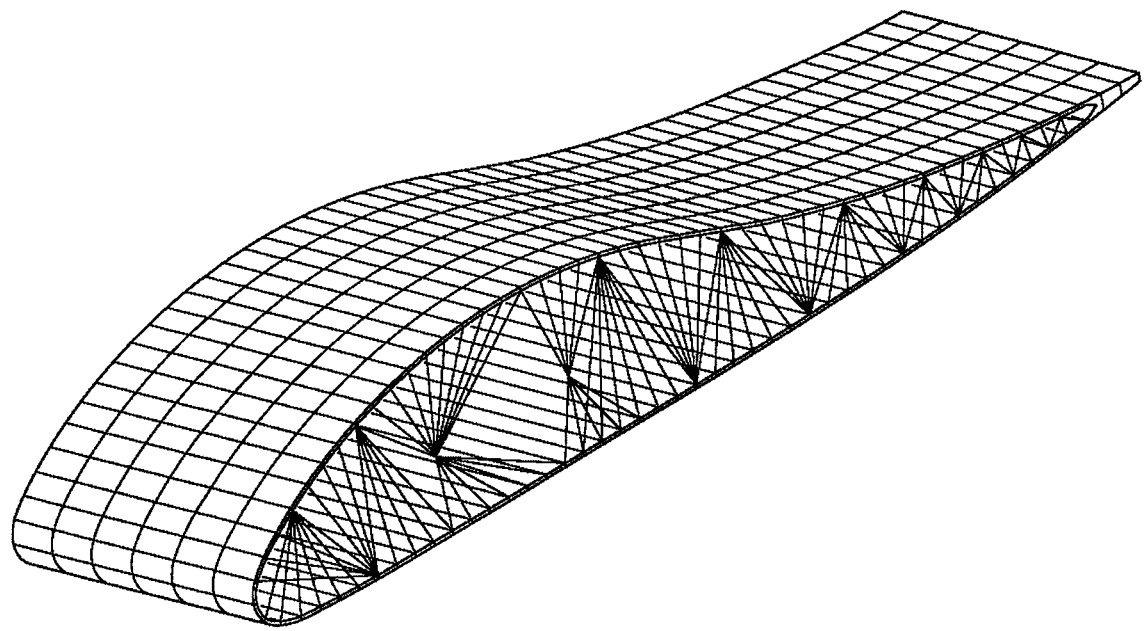
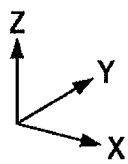
| Component Description | WEIGHT (lb) | WEIGHT (lb/ft^2) |
|---|---|---|
| upr_rib_cap | 0.319 | 0.004 |
| lwr_rib_cap | 0.229 | 0.003 |
| solar_cells | 5.966 | 0.083 |
| lwr_skin | 0.527 | 0.007 |
| foam | 3.145 | 0.044 |
| panel_wires | 0.111 | 0.002 |
| cross_braces | 0.227 | 0.003 |
| rib_truss_tubes | 0.794 | 0.011 |
| rib_truss_threads | 0.133 | 0.002 |
| skin_truss_threads | 0.194 | 0.003 |
| TOTAL (INCLUDING SOLAR ARRAY) | 11.645 | 0.163 |
| TOTAL (WITHOUT SOLAR ARRAY) | 5.679 | 0.079 |
FIG. 25

WING AIRFOIL STIFFENING FOR SOLAR POWERED AIRCRAFT

CROSS REFERENCE TO RELATED APPLICATIONS

The subject matter disclosed herein is related to the subject matter of U.S. application Ser. No. 13/276,750, filed on Oct. 19, 2011, "Segmented Aircraft Wing Having Solar Arrays", which is hereby incorporated by reference in its entirety.

TECHNICAL FIELD

The present invention relates generally to structures for stiffening an aircraft wing or other structure required to be light weight. The present invention is particularly, but not exclusively, suited for use in a light-weight and flexible wing having solar panels for generating electrical power.

BACKGROUND

Aircraft that have arrays of photovoltaic solar cells (referred to as solar panels) on the aircraft's wings for converting solar energy into electrical power are known. The electrical power may be used to operate on-board aircraft systems and/or to propel the aircraft, typically using one or more electric motors and propellers. The solar panels are typically mounted on upper surfaces of the wings because this location provides favorable exposure to sunlight and provides a relatively large area that is sufficient for mounting the number and size of the solar panels that are needed for the application.

Designing solar powered aircraft, particularly those flying at high altitudes, has several challenges. Because the solar energy collected by the panels is relatively low in density, the amount of solar generated power available for propulsion of the aircraft is relatively small, which in turn dictates that the aircraft have a relatively large wingspan and be very lightweight. However, long, lightweight wings may be highly flexible, presenting a number of problems due to the loads imposed on the wings during flight. For example, typical lightweight solar panels have a foundation of copper, rendering them relatively stiff with a relatively high coefficient of thermal expansion (CTE). Flexing of the wings during flight may cause the solar panels to experience high strains that can adversely affect the integrity of the solar panels. These strains may also result in buckling or wrinkling of the solar panels which may trip the airflow boundary layer over the wings from laminar to turbulent, or cause air flow separation, which may significantly reduce the aerodynamic performance of the aircraft.

The integrity of the solar panels and/or the aerodynamic performance of the wings may also be adversely affected by large temperature swings experienced by the aircraft during flight. These temperature swings may result in excessive stresses and strains between the solar panel and the wing structure, due to differences in thermal expansion.

The above-cited U.S. application Ser. No. 13/276,750 discloses a flexible, lightweight, solar panel equipped wing that substantially isolates the solar panels from strains experienced during flight due to wing flexing and/or differences in thermal expansion between the components of the wing. There remains a need, however, for a way to provide lightweight stiffening to the skin of solar powered aircraft that use photovoltaic solar cells mounted on the surface of the wings to operate aircraft systems.

SUMMARY

The present disclosure is directed to methods for providing lightweight stiffening to the skin of solar powered aircraft or other structures that require or benefit from minimal weight and large surface areas. Stiffening in this disclosure pertains to improving the resistance of the skin to deflection in the out-of-plane dimension due to aerodynamic or acceleration forces.

In an illustrative embodiment, the solar cells have a foundation of copper, resulting in high in-plane stiffness, and a relatively high coefficient of thermal expansion. The inventive lightweight stiffening is provided by means of rods, wires, or threads that extend from the intersection of rib and rib web truss members and a point on an opposite rib cap. From each intersection point on the lower cap with the rib web truss members, a series of wires is connected to a series of locations on the upper cap. These locations may be one or more locations, and may be evenly spaced along the cap length between the intersections of the upper cap and the rib web truss members. A similar arrangement exists for restraining the deflections of the lower cap. From each intersection point on the upper cap with the rib web truss members, a series of wires are connected to a series of locations on the lower cap. The result of attaching these wires is that the deflections of the caps due to air load are greatly reduced. The stiffness added by the wires allows the depth of the rib cap to be greatly reduced, resulting in significant weight savings.

In another illustrative embodiment, a method for stiffening a light-weight wing airfoil of a wing comprises bracing an upper skin assembly and a lower skin assembly of the light-weight wing airfoil by a first rib located at a distal end of the light-weight wing airfoil and a second rib located at a proximal end of the light-weight wing airfoil. In this embodiment, the first and second ribs are each supported by a plurality of rib trusses extending between upper and lower rib caps of each of the first rib and the second rib. The inventive method further comprises cross-bracing the light-weight wing airfoil by a plurality of wires, rigid rods, or both. The plurality of wires, rigid rods, or both extend from one of the upper or lower rib caps of the first rib or the second rib to the opposing upper skin assembly or lower skin assembly.

Other aspects of the present invention are described below.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 10 provides the context for FIGS. 11 and 12, and shows how they depict the structure for two rib truss bays.

FIG. 11 shows the rib wires corresponding to the two bays noted in FIG. 10.

FIG. 12 is a close up view of the rib and skin restraining wires.

Favorable forms for the connectors are shown in FIGS. 15 through 20.

Figure 15:
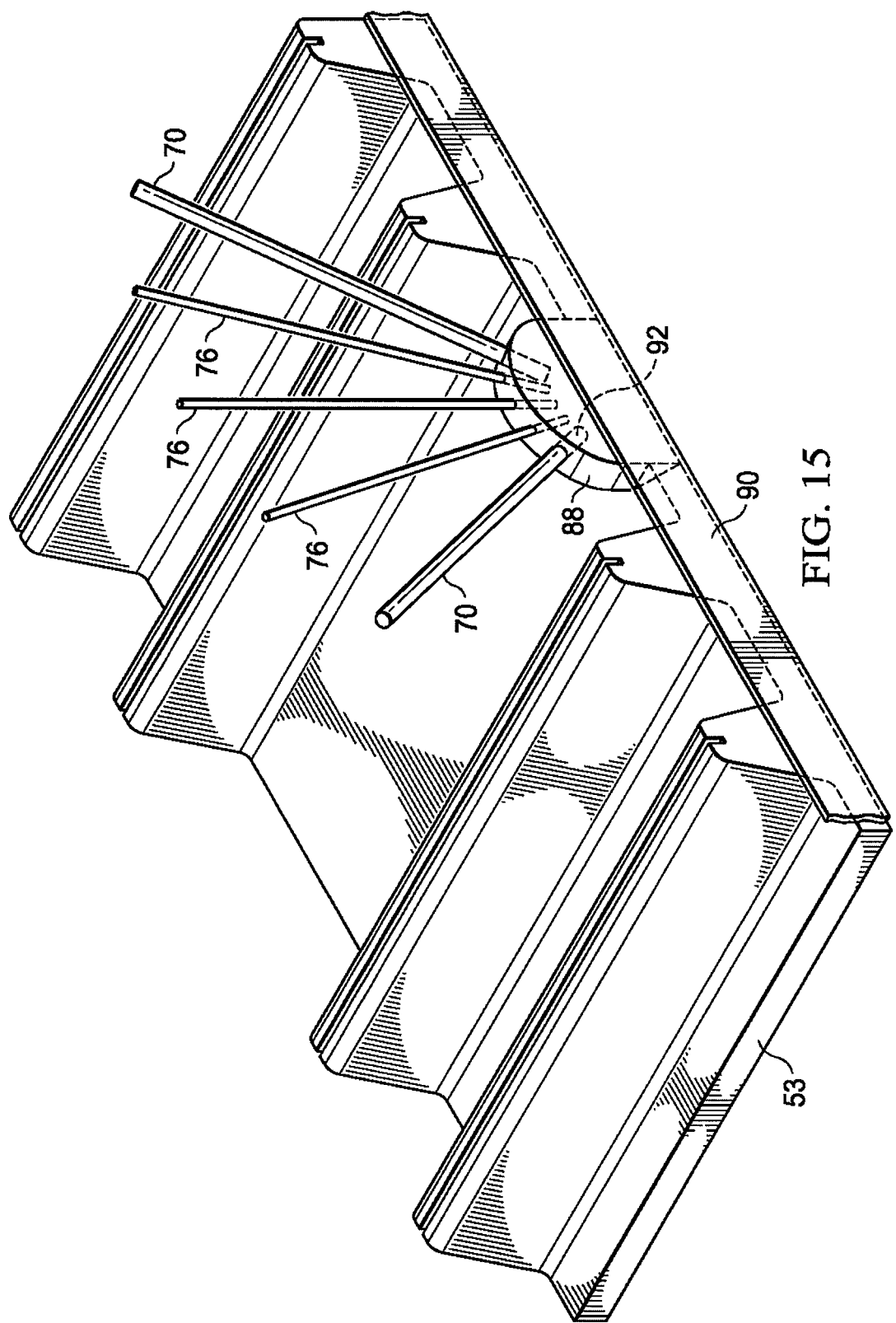

FIG. 15 shows the junction between the rib flange, skin, rib truss and rigid rods.

Figure 16:
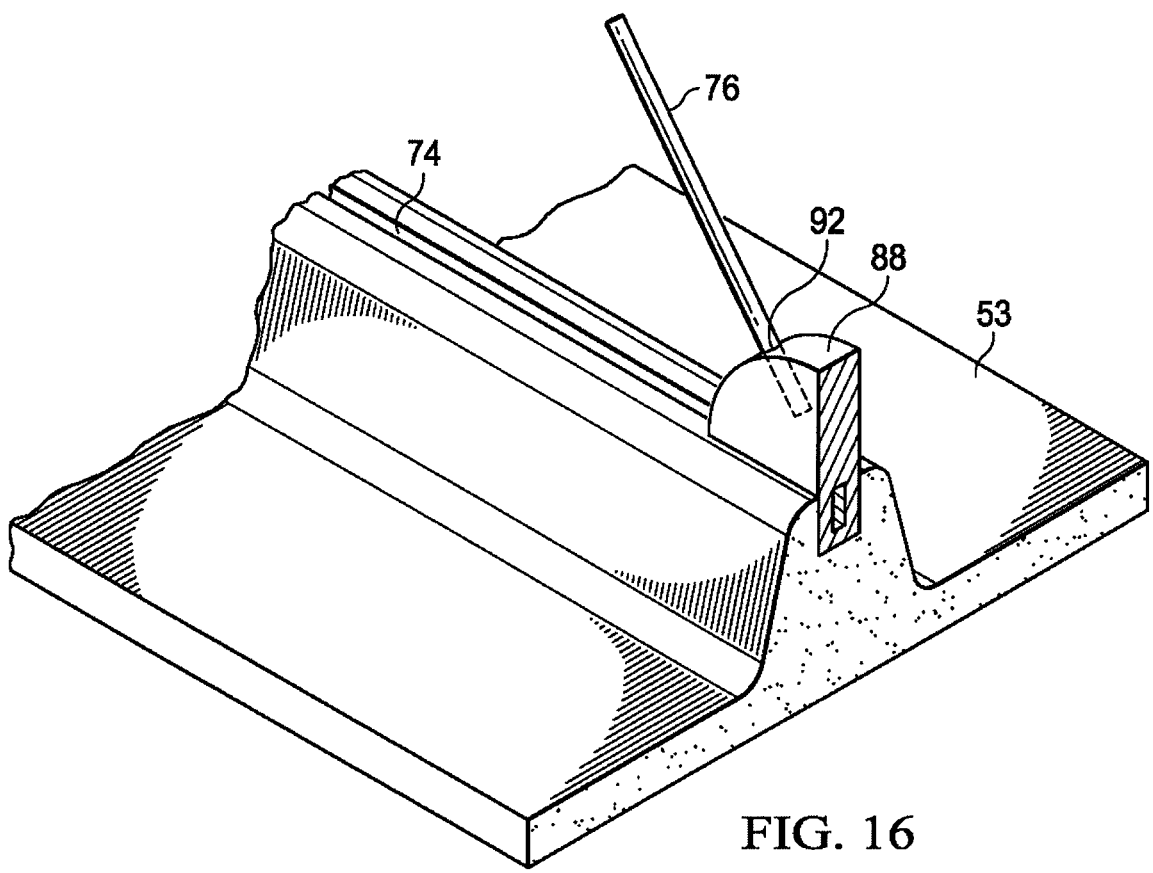

FIG. 16 shows a cross section through a connector that connects a single rigid rod to the reinforcement and skin at the interior of the skin.

Figures 17A, 17B:
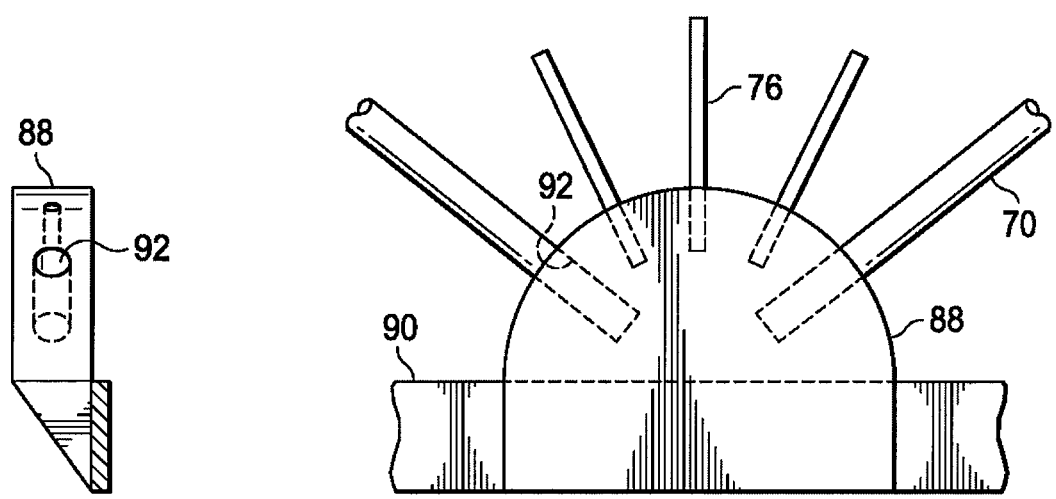

FIGS. 17A and 17B show a two-view of the connector also shown in FIG. 15.

Figure 18A:
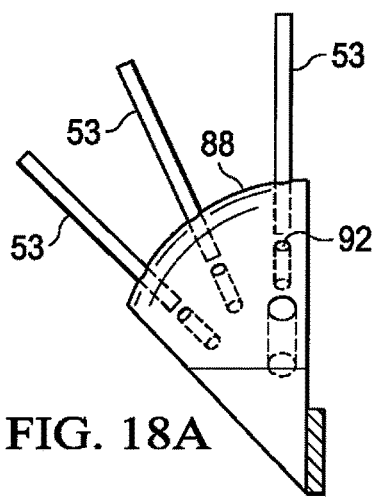
Figure 18B:
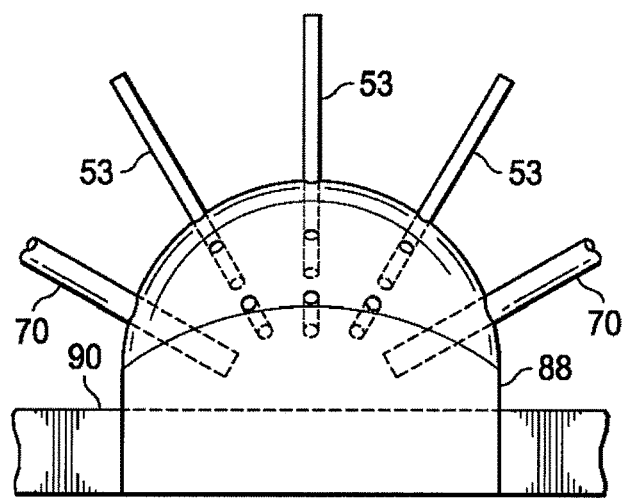

FIGS. 18A and 18B show a two-view of a connector similar to that of FIGS. 17A and 17B.

Figure 19A:
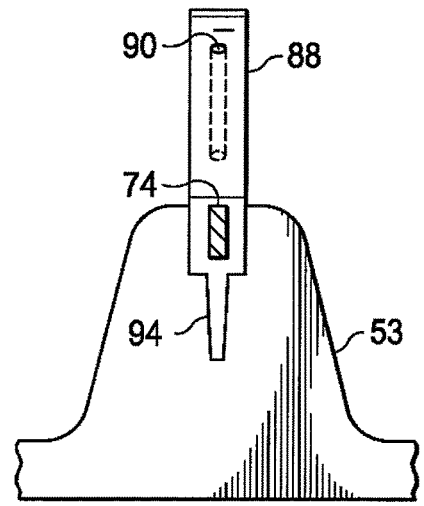
Figure 19B:
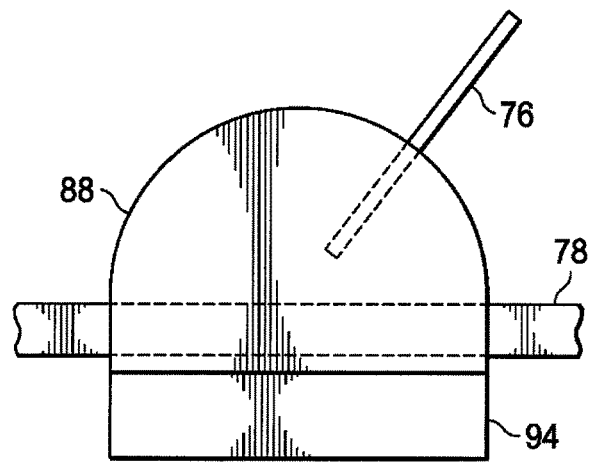

FIGS. 19A and 19B correspond to the cross section shown in FIG. 16.

Figure 20A:
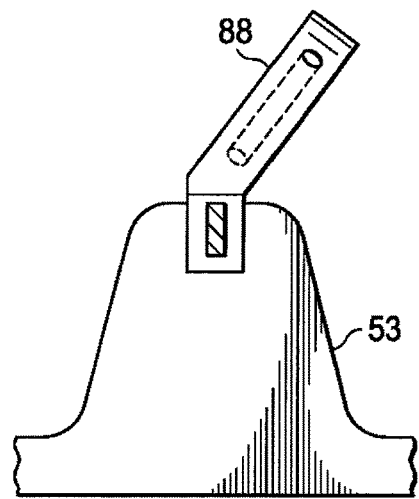
Figure 20B:
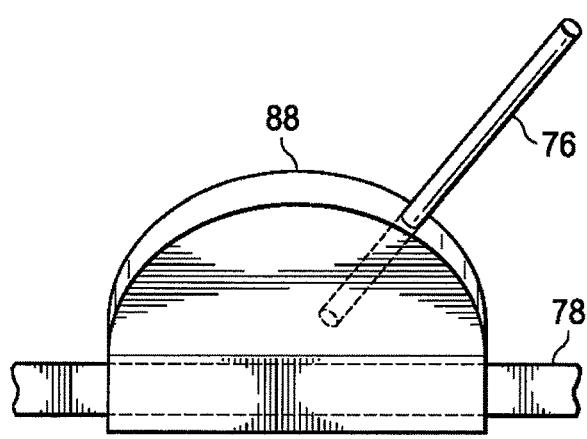
Figure 21A:
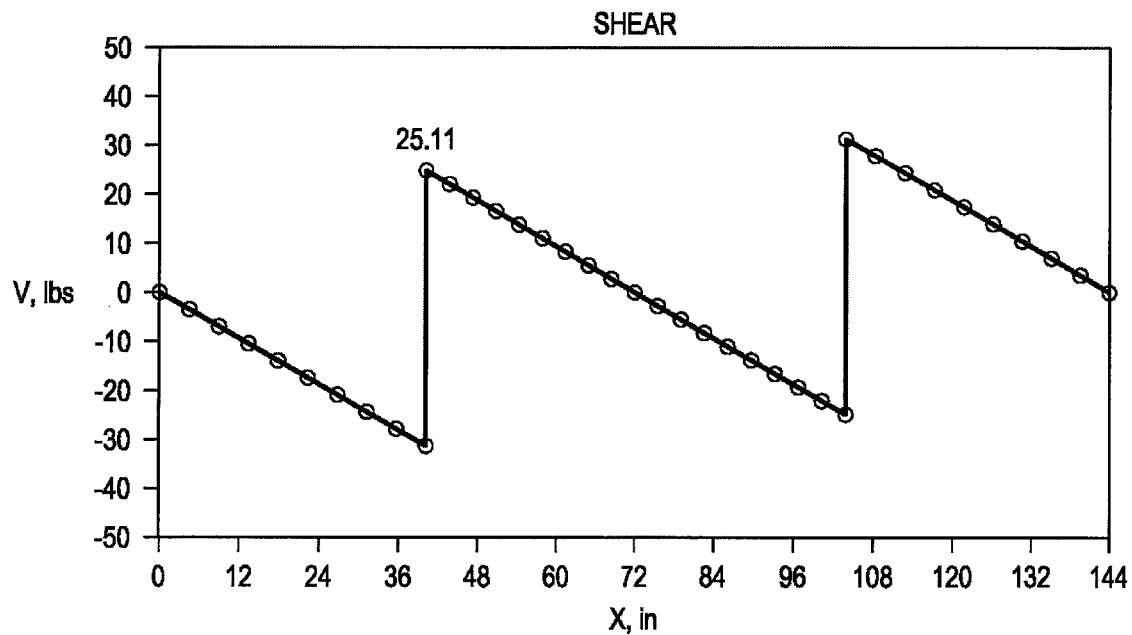
Figure 21B:
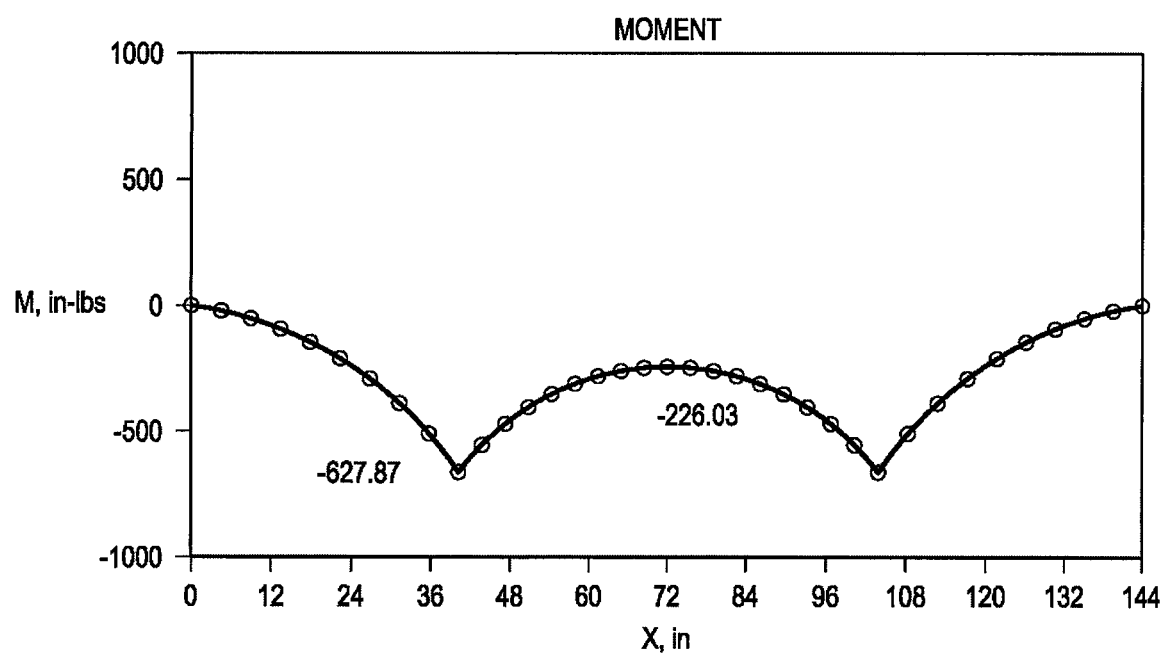
Figure 21C:
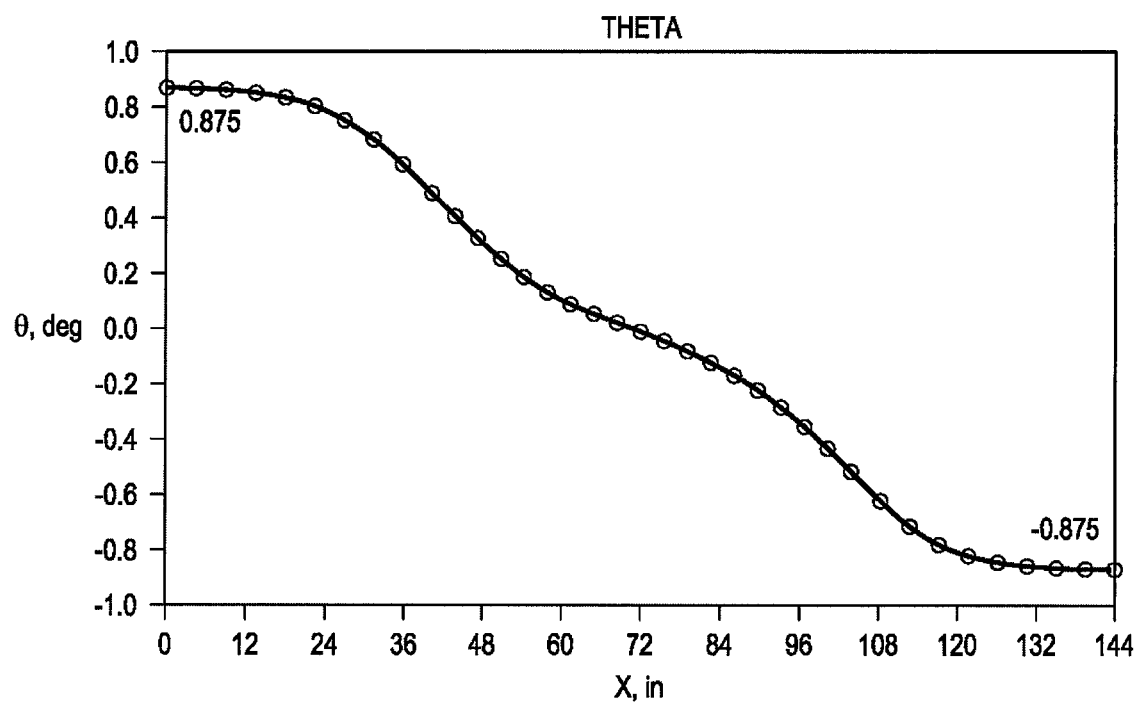
Figure 21D:
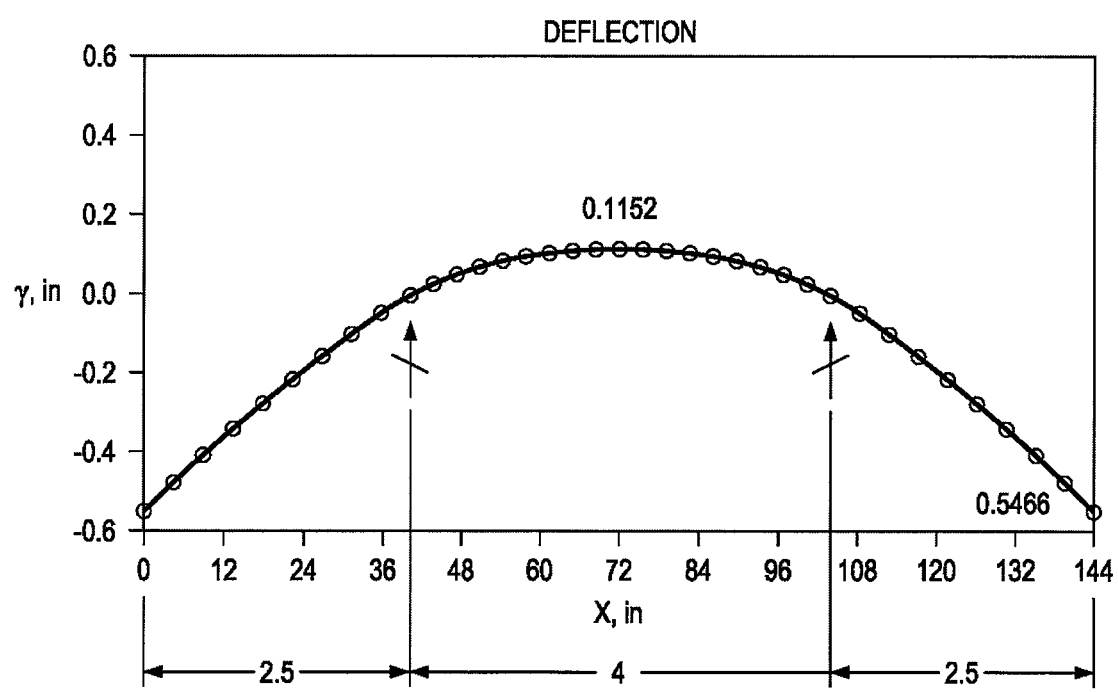
Figure 22A:
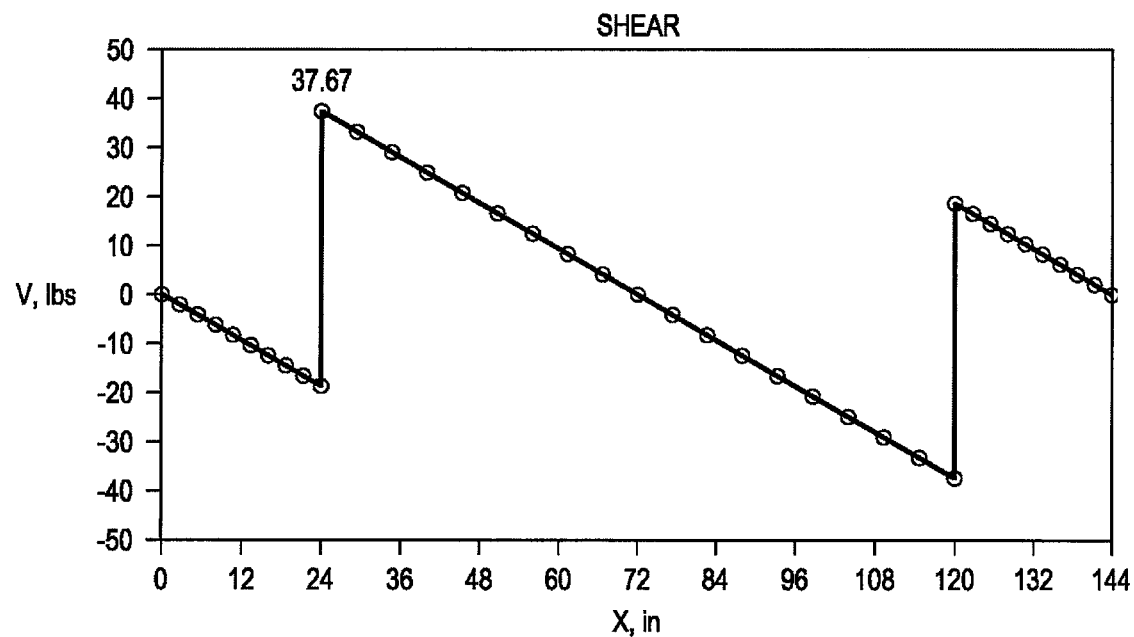
Figure 22B:
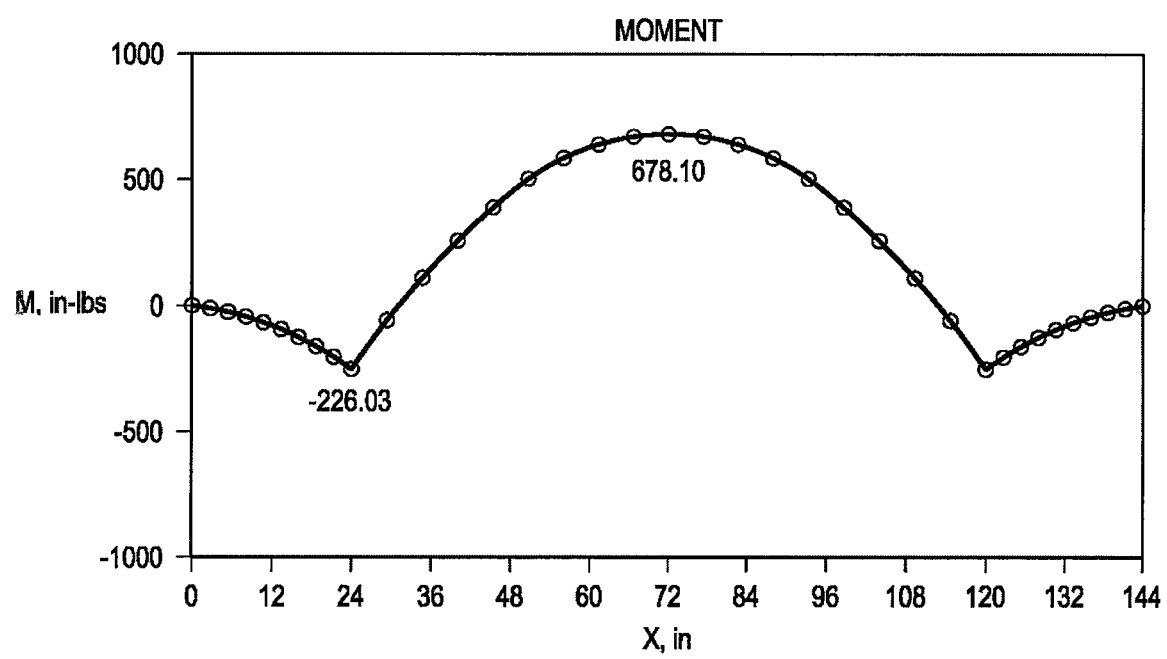
Figure 22C:
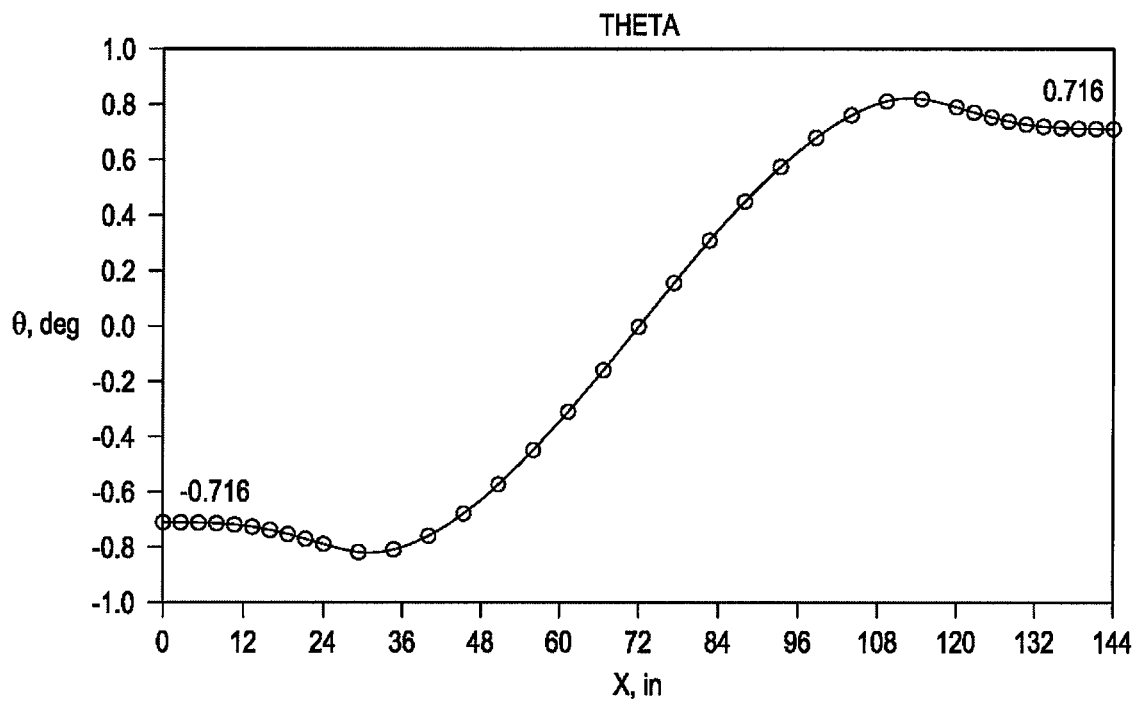
Figure 22D:
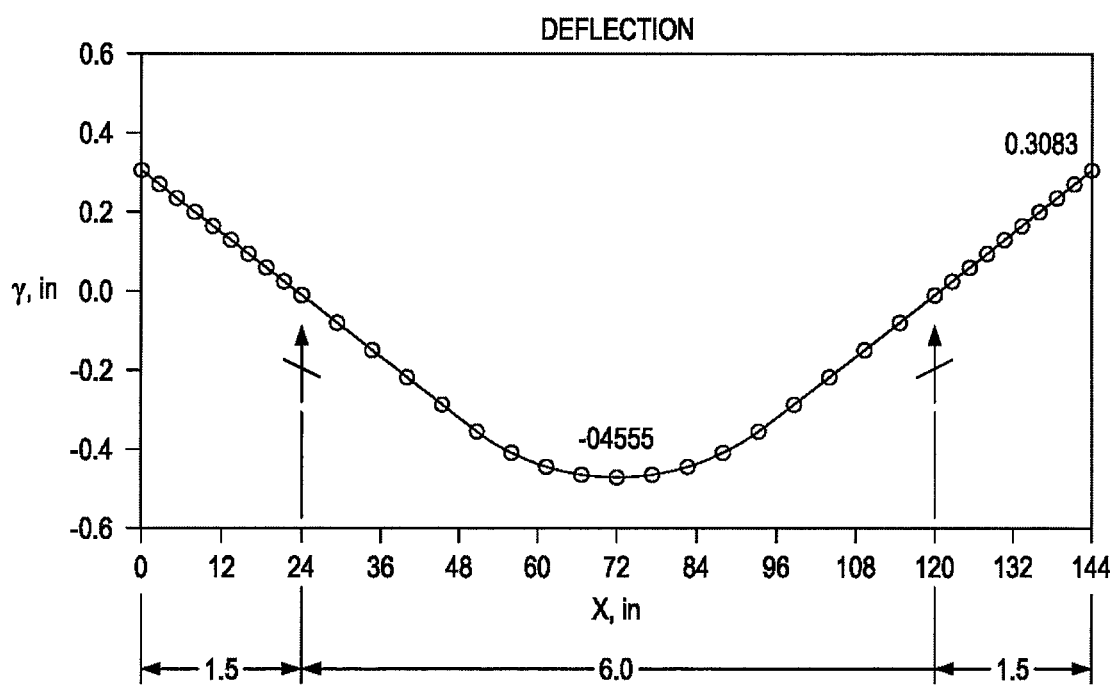
Figure 23A:
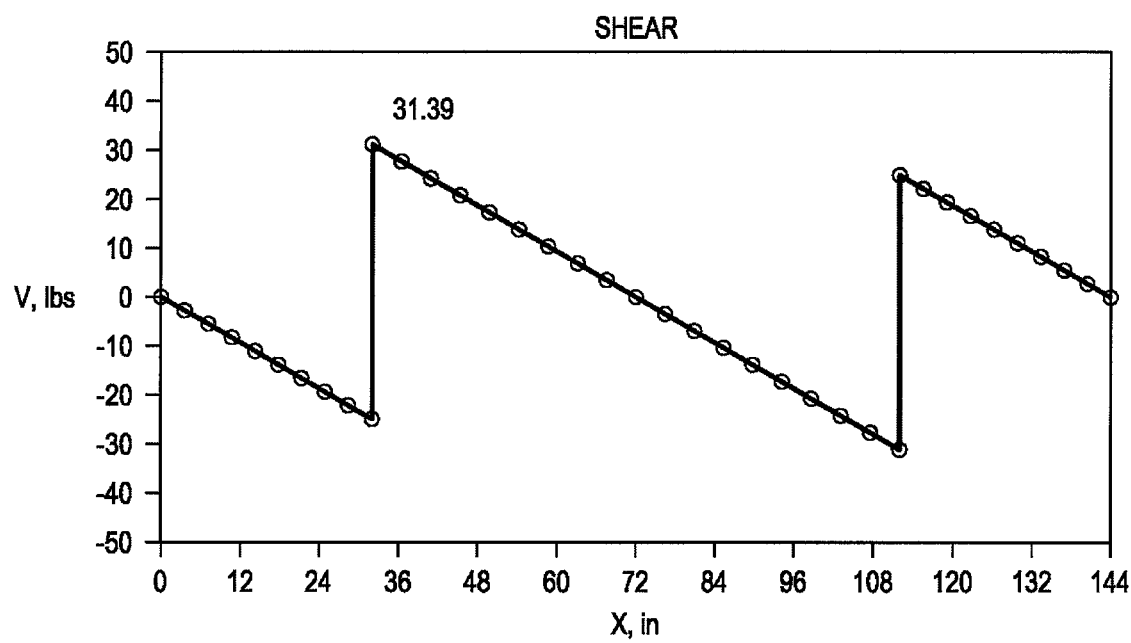
Figure 23B:
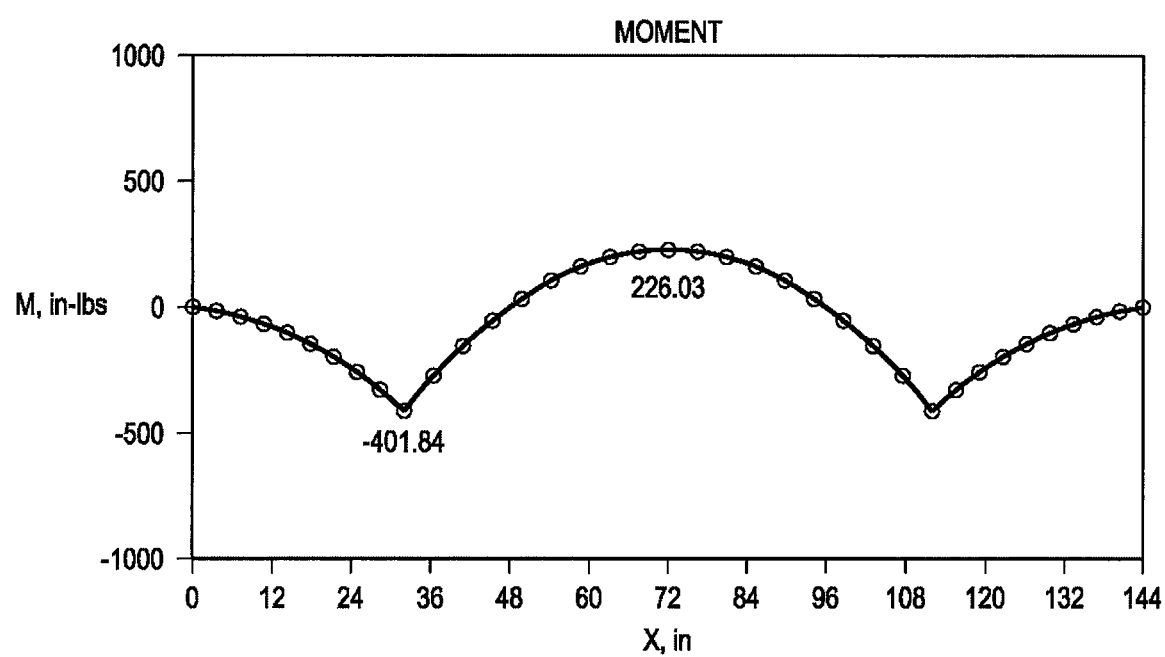
Figure 23C:
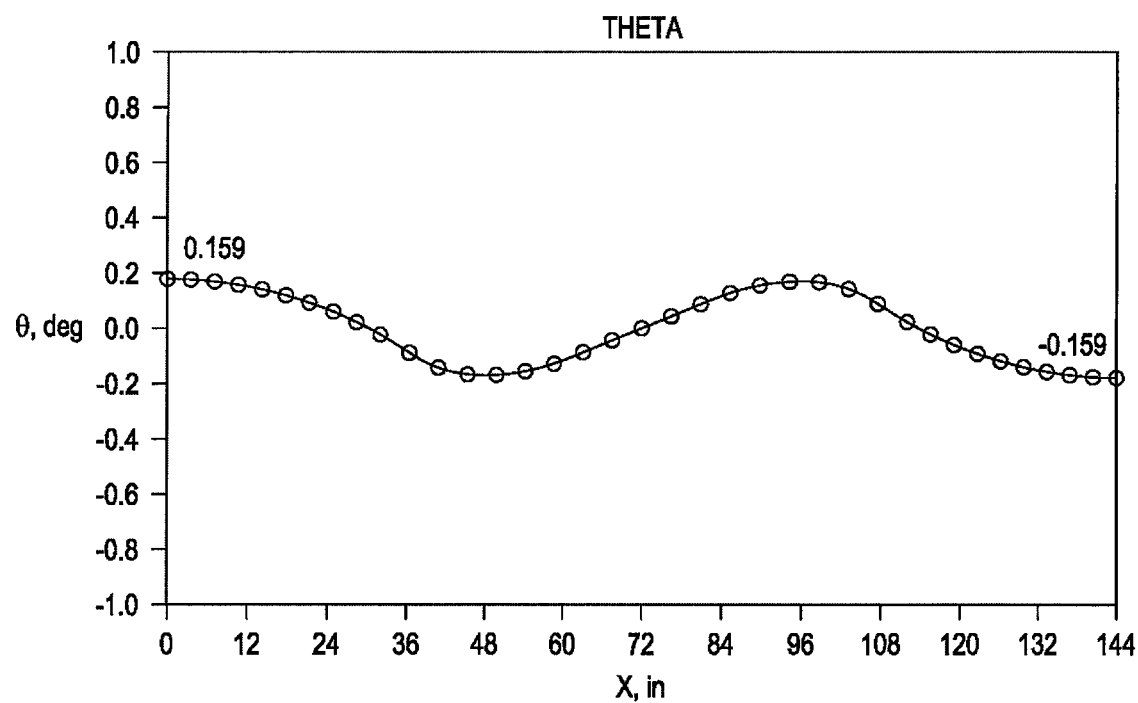
Figure 23D:
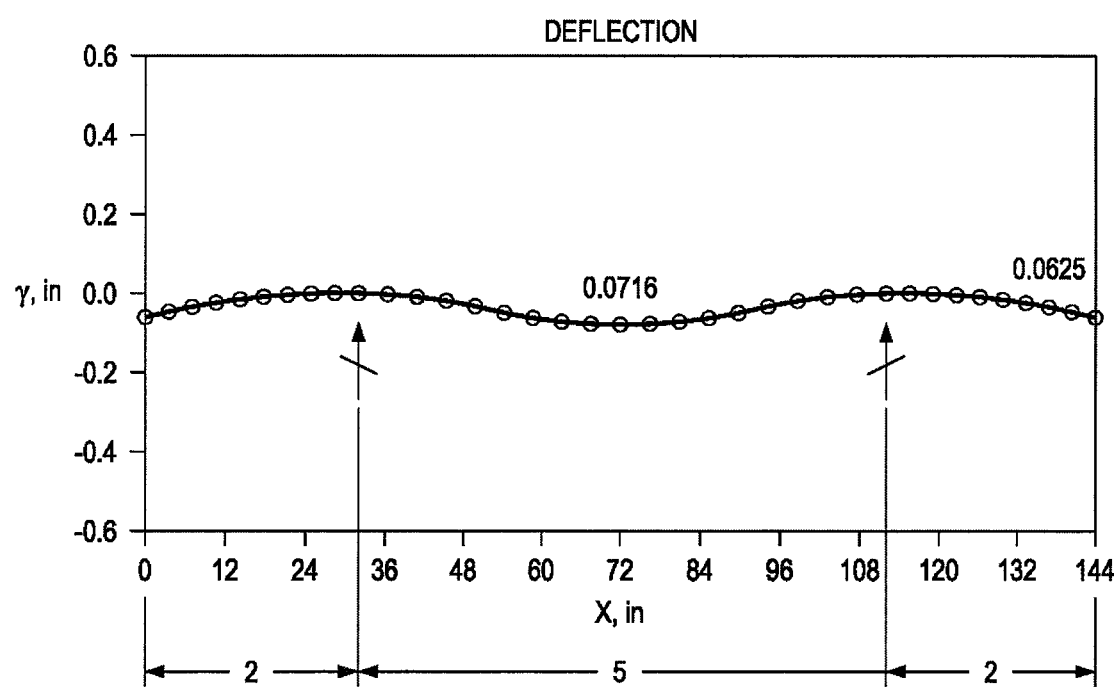

FIGS. 20A and 20B correspond to FIGS. 19A and 19B except that they omit the blade and are canted in angle to line up with a rib node that is ahead or behind the particular location of the connector.

FIGS. 21A, 21B, 21C and 21D are a set of graphs showing shear, moment, rotations, and deflection (respectively) as a function of the location of the rib supports, with the supports being too far in from the ends.

FIGS. 22A, 22B, 22C and 22D are a set of graphs showing shear, moment, rotations, and deflection (respectively) as a function of the location of the rib supports, with the supports being too close to the ends.

FIGS. 23A, 23B, 23C and 23D are a set of graphs showing shear, moment, rotations, and deflection (respectively) as a function of the location of the rib supports, with the supports being positioned advantageously.

Figure 6:
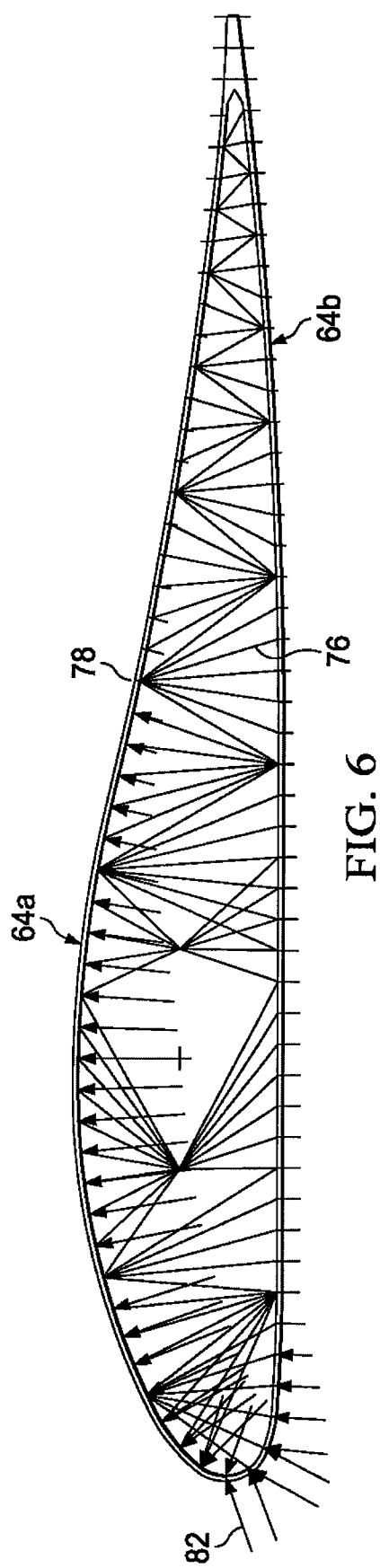
FIG. 6 is an illustration of the addition of rib wires that extend from the intersection of the rib and rib web truss members and a point on the opposite rib cap, in accordance with an embodiment of the present invention.

FIGS. 24 and 24A are illustrations of a modified version of the FIG. 6 configuration in which the trailing edge portion includes wires made of shape-memory alloys that can be used to change the shape of the trailing edge such that it can function as a control surface.

FIG. 25 depicts weight savings that can be achieved by using rib wires and skin bracing wires in accordance with the present invention.

DETAILED DESCRIPTION OF ILLUSTRATIVE EMBODIMENTS

In the following sections, we describe illustrative, presently preferred embodiments of the invention. We first provide an overview of the wing airfoil for solar powered aircraft, as described in greater detail in U.S. application Ser. No. 13/276,750, and then we provide a detailed description of illustrative embodiments of inventive stiffening structures in accordance with the present invention.

A. Overview of Wing Airfoil for Solar Powered Aircraft

Figure 1:
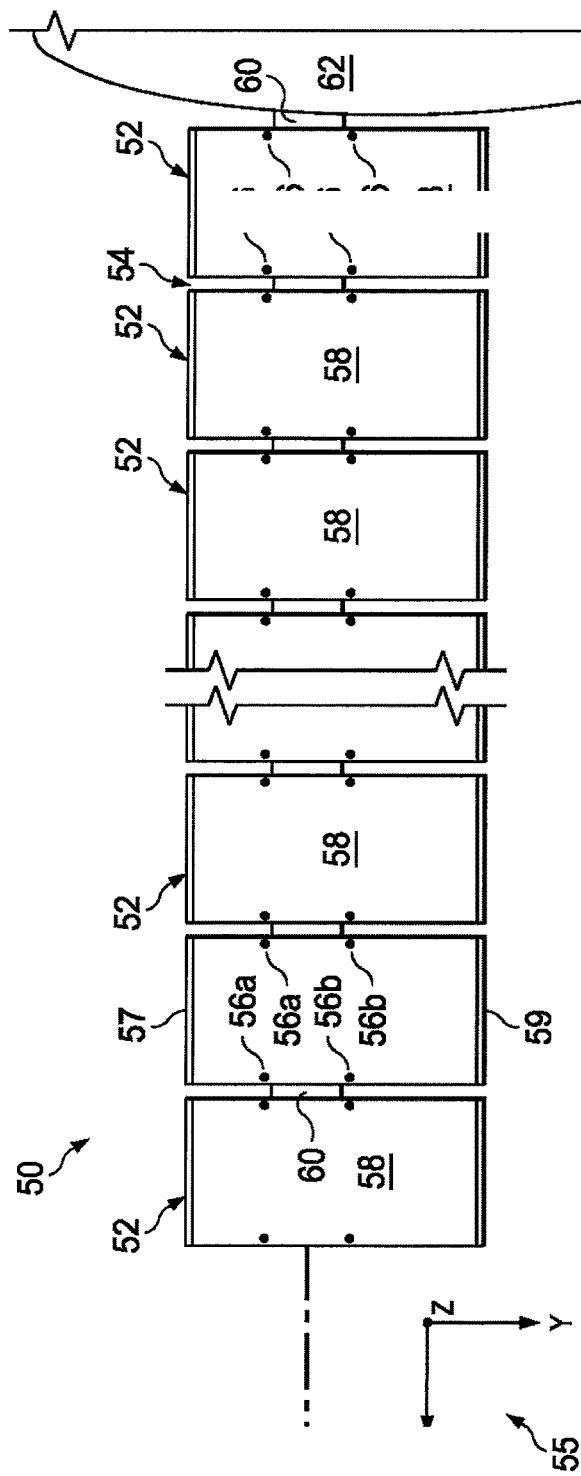
FIG. 1 is an illustration of a segmented wing having solar panels.

Referring first to FIG. 1, an aircraft wing 50 may be attached to a pod or fuselage 62 and is segmented into a plurality of separate wing segments 52 that are spaced apart from each other to form gaps 54 of variable width. It should be noted however, the principles of the disclosed embodiments are applicable to a wing 50 comprising a "flying wing" type aircraft that does not employ a pod or fuselage. Each of the wing segments 52 may be mounted on wing spar 60 for movement relative to the wing spar 60 when the wing spar flexes during flight. In one embodiment, each of the wing segments 52 is attached to and supported on the wing spar 60 by pivotal joints 56, however, other types of joints allowing this relative movement between the wing segments 52 and the wing spar 60 are possible. The pivotal joints 56 may comprise a pair of laterally spaced forward joints 56a, and a pair of laterally spaced aft joints 56b. In the illustrated embodiment, four pivotal joints 56 pivotally connect each wing segment 52 to the spar 60, however in other embodiments, more or less than four pivotal joints 56 may be employed. In the illustrated example, the spar 60 is substantially circular in cross section throughout its length, however other cross sectional shapes may be possible, either along a portion of or the entire length of the wing 50. Further, the cross section shape of the spar 60 may vary and/or taper along its length.

For convenience of description, an X,Y,Z Cartesian coordinate system 55 will be used to describe the orientation of the various components of the wing 50. The X direction may be sometimes also referred to as the span-wise direction, and the Y direction may be referred to as the chord-wise or fore and aft direction, while the Z direction may also be referred to as the vertical direction. As will be discussed below in more detail, the wing spar 60, and thus the wing 50, may twist about its longitudinal axis 68 and/or simultaneously flex in the XY and XZ planes, or any combination of the XY and YZ planes along with twisting about the longitudinal axis 68. Each of the wing segments 52 has a leading edge 57, and a trailing edge 59. One or more of the wing segments may include a solar panel 58 for collecting solar energy and converting it into electrical power. The spar 60 may be produced from any suitable material such as, for example and without limitation, carbon fiber epoxy and has a longitudinal axis 68 that normally extends span-wise in the X direction 55. However, the spar 60 may flex fore and aft in the XY plane 55 as well as in the vertical direction (Z axis).

The span-wise spacing between the wing segments 52 forming the variable width gaps 54 provides clearance between the segments 52 that that allows the segments 52 to move in both the XY and XZ planes 55 or any combination thereof without interfering with each other. While each of the wing segments 52 is shown as having a solar collection panel 58 mounted thereon it is possible that in some embodiments only certain of the wing segments 52 may include one or more solar panels 58.

Segmentation of the wing 50 into separate wing segments 52, and use of joints 56 allowing relative movement between the wing segments 52 and the wing spar substantially isolates the solar panels 58 from strains produced by wing deflection and/or changes in temperature during flight. This wing segmentation along with the pivotal joints 56 provides a stable load path allowing transfer of aerodynamic and inertial loads from the wing segment 52 to the spar 60, while isolating the solar panels 58 from loads produced by flexing of the wing spar 60 during flight, and/or dimensional changes due to thermal expansion of the components of the wing 50.

Figure 2:
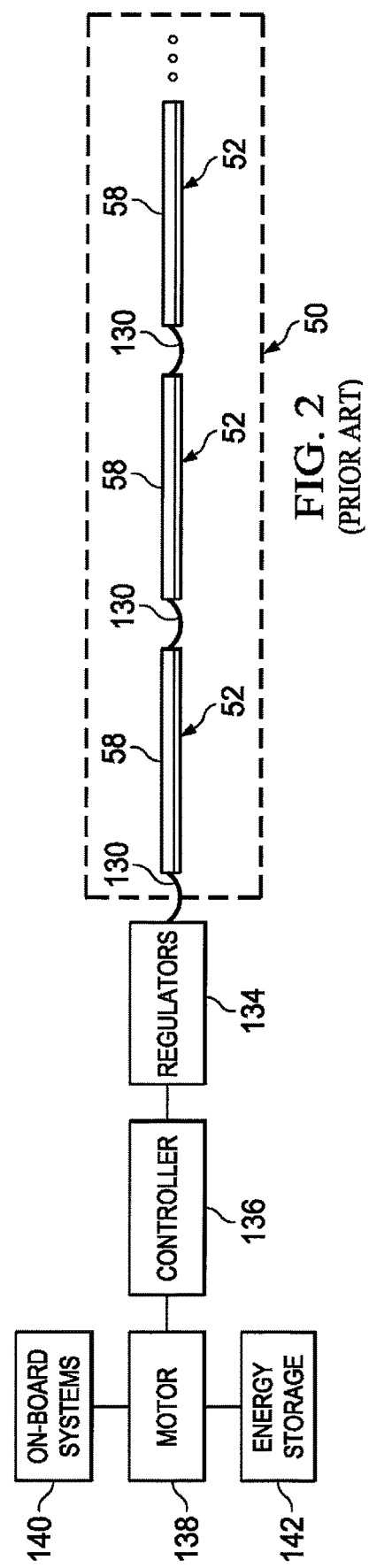
FIG. 2 is an illustration of a combined block and diagrammatic view of the segmented wing shown in FIG. 1, along with an onboard electrical system.

Referring now to FIG. 2, the solar collection panels 58 are electrically coupled with each other and with one or more on-board regulators 134 by means of electrical conductors 130 which will be discussed later in more detail. The regulator 134 regulates DC power generated by the solar panels 58 into AC power which is controlled by a controller 136 to operate propulsion motors 138, and/or other on board systems 140. The power generated by the solar panels 58 may also be directed to energy storage devices 142 such as on-board batteries.

Figure 3:
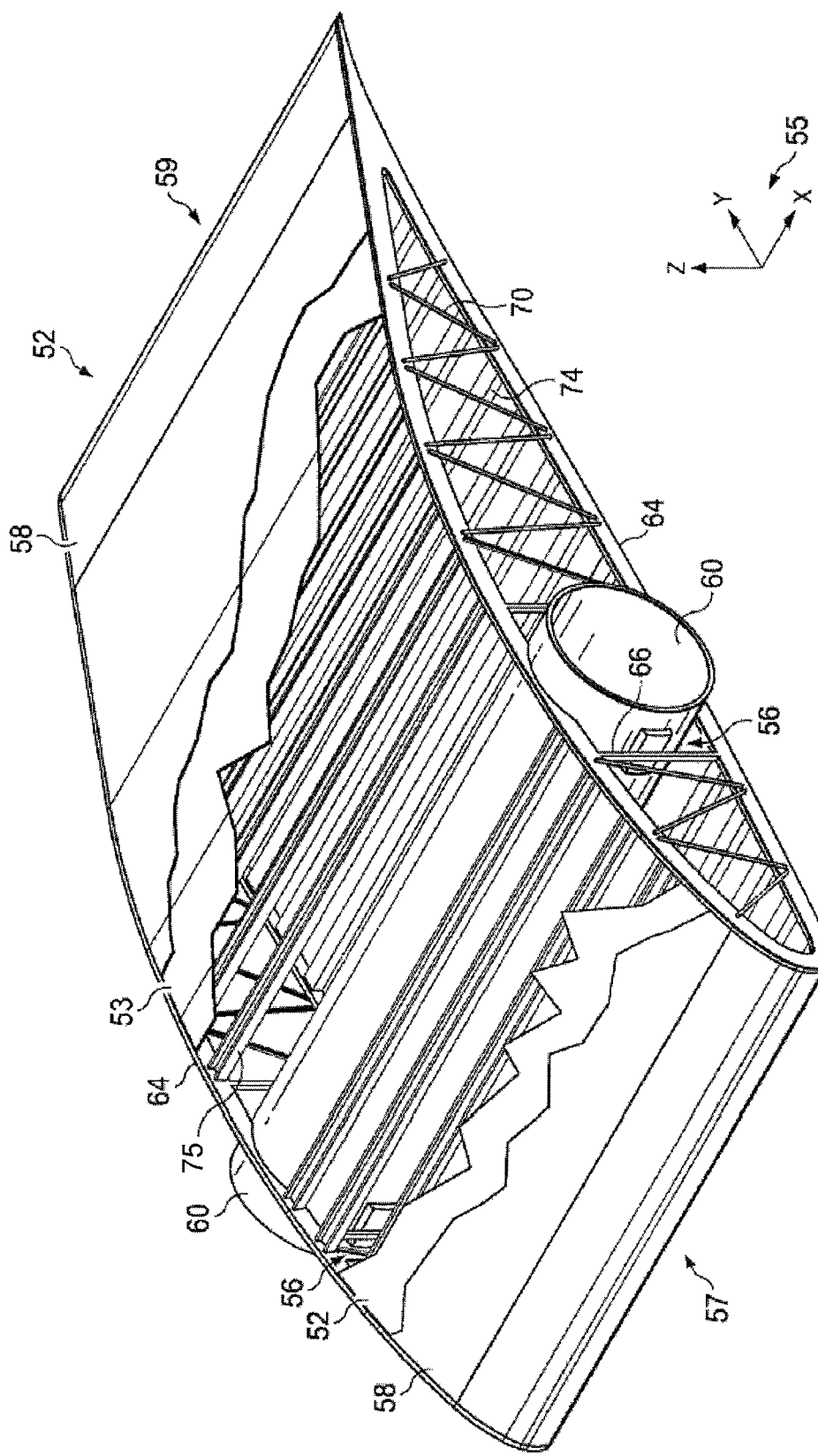
FIG. 3 is an illustration of a perspective view of one of the wing segments shown in FIG. 1, parts of the solar panel and the wing skin being broken away for clarity.
Figures 4, 5:
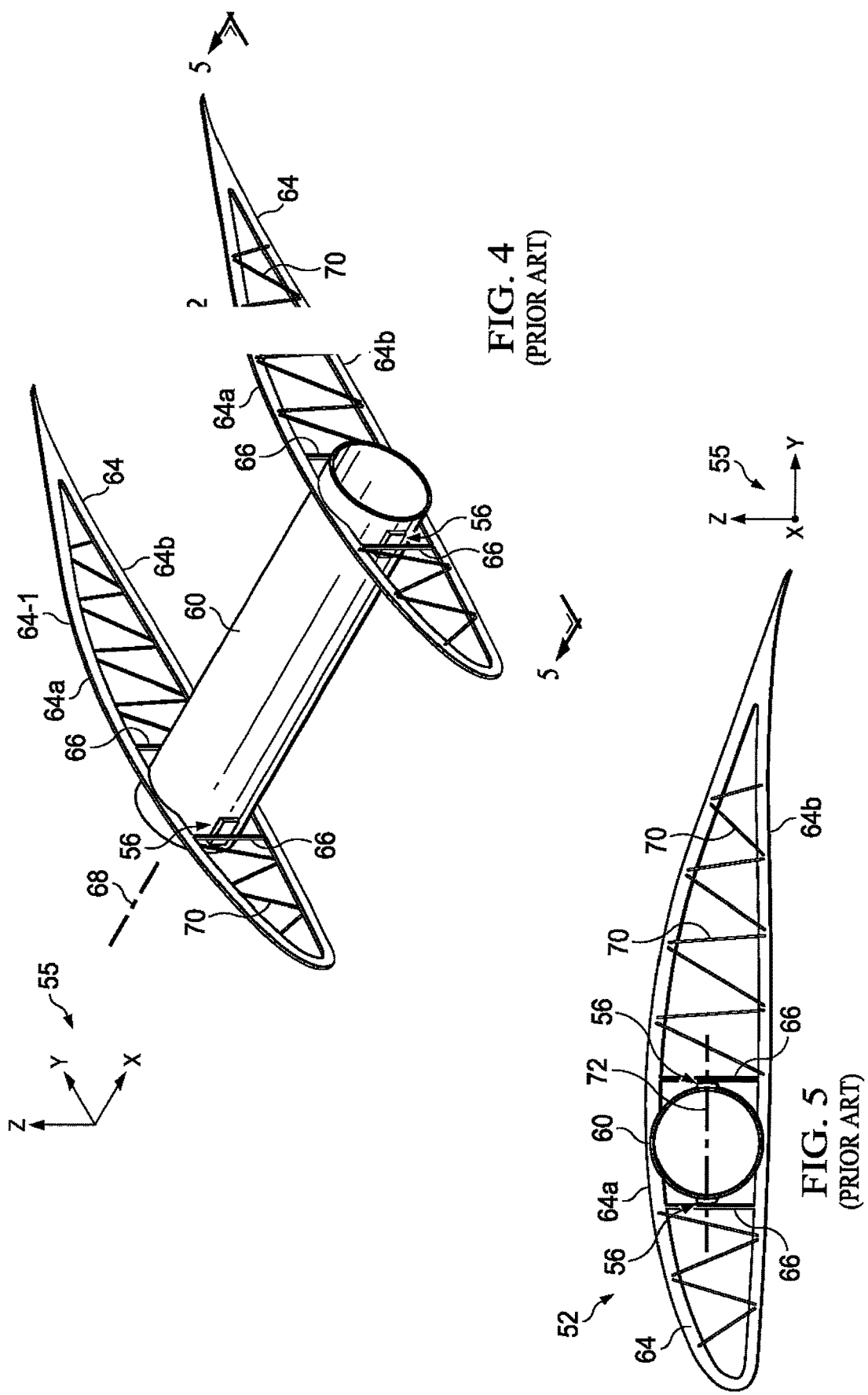
FIG. 4 is an illustration of a perspective view of a pair of wing ribs pivotally mounted on a portion of the wing spar.
FIG. 5 is an illustration of an end view taken in the direction designated as "5" in FIG. 4.

Attention is now directed to FIGS. 3, 4 and 5 which show additional details of one of the wing segments 52. Each of the wing segments 52 includes a pair of spaced apart wing ribs 64, each generally in the shape of an airfoil and may be stiffened by truss members 70 extending between upper and lower caps 64a, 64b respectively of the rib 64. In other embodiments, the ribs 64 may be stiffened by means other than truss members 70. Each of the ribs 64 further includes a generally vertical rib bracket 66, fore and aft of the spar 60.

Each of the rib brackets 66 is coupled with the wing spar 60 by one of the pivotal joints 56. The ribs 64 are structurally connected with each other by an outer skin 53 as well as by structural stiffeners such as stringers 74 which may be formed of any suitable, lightweight structural material, such as a composite.

The pivotal joints 56 allow the wing segments 52 to pivot on fore and aft axes 72 relative to the spar when the spar 60 flexes during flight. While the illustrated wing segment 52 employs two spaced apart wing ribs 64, in an alternate embodiment (not shown), the wing segment 52 may be fixedly mounted on the spar 60 by a single wing rib 64 that is generally located near the span-wise center of the segment 52 along the axis 68 of the spar 60, and may form the sole support between the wing segment 52 and the wing spar 60. The use of a single wing rib 64 may be desirable in applications where the wing segments 52 are relatively narrow.

The outer skin 53 (FIG. 3) may be stiffened as required by the stringers 74. The skin 53 may comprise, for example and without limitation, a suitable structure, for example structural foam, such as styrene foam. As will be discussed later in more detail, the stringers 74 and the skin 53 may be integrally formed from the same material such as structural foam, resulting in a skin 53 in the shape of an airfoil that is both structural and stiffened as required for the application, yet is lightweight. The solar collection panel 58 is located on top of the skin 53 and may extend from slightly aft of the leading edge 57 of the wing segment 52 to the trailing edge 59. In other embodiments, the solar panel 58 may cover only a portion of the top surface of the skin 53.

The solar panel 58 may comprise an electrically conductive layer (not shown in FIG. 3) such as copper bonded to an underlying polymer film layer (not shown), such as Mylar. In one example, the solar panel 58 and the skin 53 may be laminated together into a panel sandwich, in which the skin 53 is formed by a core, and the solar panel 58 along with underlying metal stiffeners functions to stiffen the solar panel 58. In other embodiments, the solar panel 58 may be separate from but bonded to the skin 53. The solar panels 58 may be formed of multiple solar cells (not shown) laminated into a single panel conforming to the contour of the skin 53 with relatively low strain levels.

As discussed previously, the wing segment 52 is stiffened as necessary using a desired combination of the stiffness of the solar panel 58, the structural stiffness of the skin 53 and internal stiffeners such as the stringers 74. Where additional stiffening is necessary, the wing segments 52 may include other forms of internal stiffeners as described in U.S. application Ser. No. 13/276,750.

B. Wing Airfoil Stiffening (including Rib Wires, Skin Wires, and Manufacturing)

A primary problem addressed by the present invention pertains to the wing structure of solar powered aircraft. Since solar power is not a very high density power, there is not a large amount of propulsion, and therefore solar powered aircraft must be very light and quite large. Because of these requirements, the structure is typically quite flexible. The upper surface of the wing is typically covered with solar arrays.

As discussed above, the wing's primary structural member is typically a tube, which can take both wing bending loads and torsion. The tube is typically made of carbon composite materials. If the upper wing skin is attached to the composite spar with no strain isolation, bending of the wing will cause the solar cells to experience high strains if the thickness of the solar cell array is thick enough to preclude buckling. (Strain is defined as the linear deformation per unit length. Something may be said to be strained by 1% if it is lengthened or shortened one inch over a 100-inch length.) If the strains are too high, the solar cells will break. If the thickness of the solar array in combination with the supporting skin is insufficient to preclude buckling, it will buckle and/or wrinkle. This buckling or wrinkling can damage the solar array from excessive wrinkling, or significantly reduced aerodynamic performance caused by the wrinkling skins tripping the boundary layer from laminar flow to turbulent or by flow separation or both.

There are many problems in the current art should be considered. Lightweight solar cell panels may be large in dimension at approximately 3 ft.×9 ft. Also, lightweight solar cell panels may be very thin in thickness approximately 0.010 inch overall. Solar cells may be mounted on wing surfaces to receive direct or indirect sunlight, but solar cell panels may have strain limits substantially below strains produced at the surface of the wing by wing flexure. Solar powered airplanes may operate over a wide range of temperatures. Differences in temperature and thermal expansion between wing structure and solar panel structure may result in stresses (and strains) between the solar panel and the wing structure. Solar cell panels may tend to buckle if subjected to compressive strains. This may result in unacceptable aerodynamic performance or may damage the solar panel. Therefore one must support the thin solar panel in a way that avoids transferring strain from the wing surface to the solar panel. These strains may arise from wing flexure or differential thermal expansion. A solar panel that is not subjected to strain by external elements will remain undistorted (and smooth). A secondary problem is to solve the main problem with a solution that is, very lightweight, manufacturable, durable and reliable, and synergistic with other systems.

Solutions exist for the known problems, but they have certain drawbacks. One way to prevent high strains and/or buckling in the solar array is to increase the stiffness of the wing structure so that the solar arrays do not experience strains over their allowable limits. Such a "solution" will be heavy, since the composite spar is now sized by maximum deflections instead of maximum stresses. This is not advantageous. A limber wing concept typically uses a circular torque tube, which carries the vertical and horizontal bending caused by lift and drag/thrust, respectively, and torsional bending moments. The wing skin is typically a thin heat-shrink film in the aft portion of the wing section. In the forward section of the wing, formers can be used to maintain a wing section shape that is acceptable for aero smoothness and shape.

For limber wings, three approaches can be considered for arranging the solar cells to the wing surface. One approach is to affix the solar cells to the skin in a patchwork arrangement, with a space in between each cell. The skin to which the cells are fixed can thus stretch or contract to accommodate the curvature of the wing as it bends. The gap must be sized such that the difference in length resulting from the wing curvature over the length of the cell can be accommodated by the wing skin. If the gap is too small, the stresses in the skin in the gap area will be too large. In addition, this solution may present problems with aerodynamic smoothness, because the eccentricity between the cell and the skin to which it is attached will cause the skin to exhibit waviness at the edges of each cell. This is not good for aerodynamic smoothness of the upper skin. Depending on the size of the gap, the gap represents lost area available for solar power collection, which directly impacts the efficiency of the vehicle.

Another approach is to "shingle" the cells so that cells can be electrically connected in strings. The disadvantage of item A is still present, but manufacturing and assembly may be easier. However, the larger the area that is shingled, the more the behavior resembled the behavior of the structure described in item 1. As the size of the solar array becomes greater, the disadvantage becomes readily apparent. Because the solar array has significant membrane and bending stiffness by virtue of the high modulus of elasticity of the copper-based solar cells, it is not possible to bend them into compound curvature. The thin skins assume a compound curvature because they are pre-tensioned in both directions between two straight surfaces and two curved surfaces. As a result, the wing skin curved in both directions is incompatible with large flat-wrap solar panels. One reason these challenges are quite pronounced is that this type of vehicle may have strict discontinuity and waviness requirements to maintain upper surface laminar flow. These requirements may be necessary to achieve sufficient vehicle performance.

Yet another solution to this problem is described in U.S. application Ser. No. 13/276,750, which discloses full depth spars extending span-wise between the ribs to provide the wing segment with added rigidity. In the following section, we describe an improved wing airfoil stiffening system.

Three aspects of the inventive stiffening structure will now be discussed. These include rib wires, skin wires, and manufacturing (including aspects of the connector, rib truss, rigid rods, rib flange, skin, and reinforcement).

Figure 7:
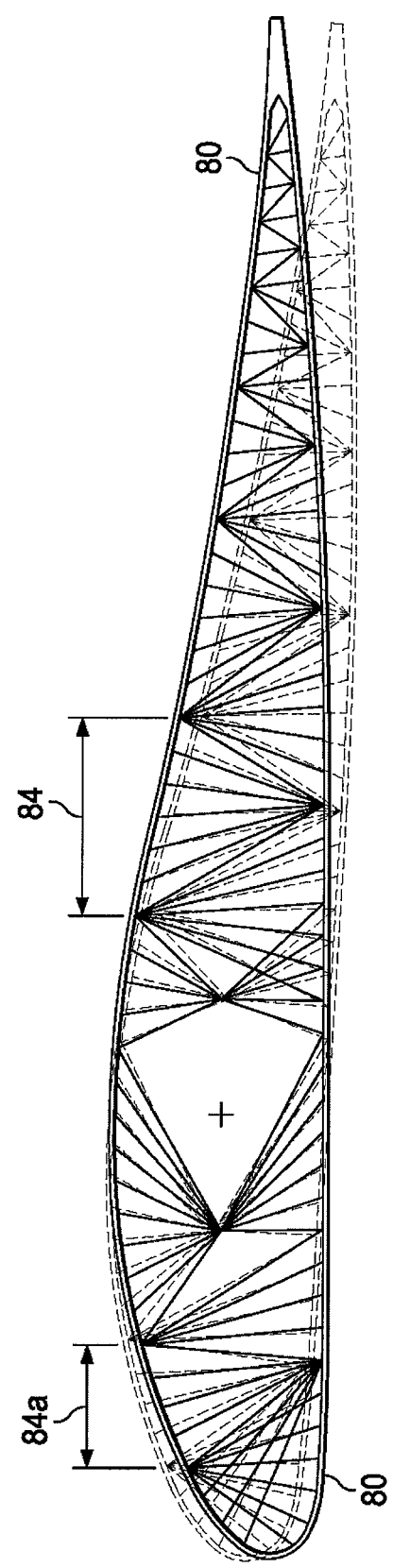
FIG. 7 illustrates the reduction of cap deflections due to the rib wires.
Figure 8:
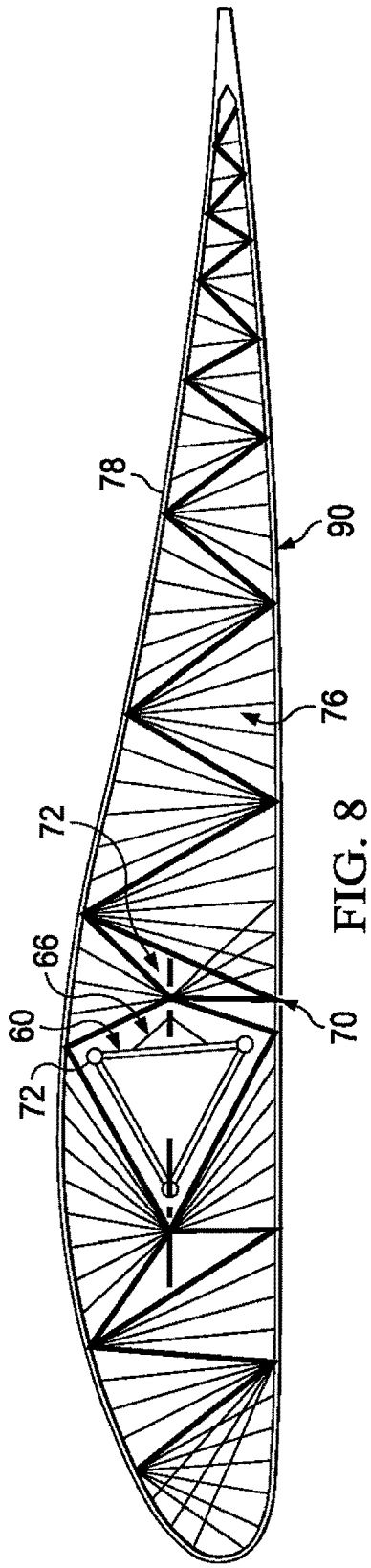
FIG. 8 illustrates the structure of the embodiments of FIGS. 6 and 7 in greater detail.

Referring now to FIGS. 6-8, the present invention shares the elements of the configuration described in the previous section, with the addition of rods, wires, or threads, which are generally referred to as support members 76, that extend from the intersection 78 of the rib or rib cap 64 and rib web truss members 70 and a point on the opposite rib cap 64. Thus from each intersection point 78 on the lower rib cap 64-b with the rib web truss members 70 there is connected a series of wires or support members 76 to a series of locations on the upper rib cap 64a. These locations may be one or more locations, and may be evenly spaced along the rib cap length between the intersections 78 of the upper cap 64a and the rib web truss members 70. A similar arrangement exists for restraining the deflections of the lower rib cap 64b. From each intersection point 78 on the upper rib cap 64a with the rib web truss members 70 there is connected a series of wires 76 to a series of locations on the lower rib cap 64b.

Figure 7A:
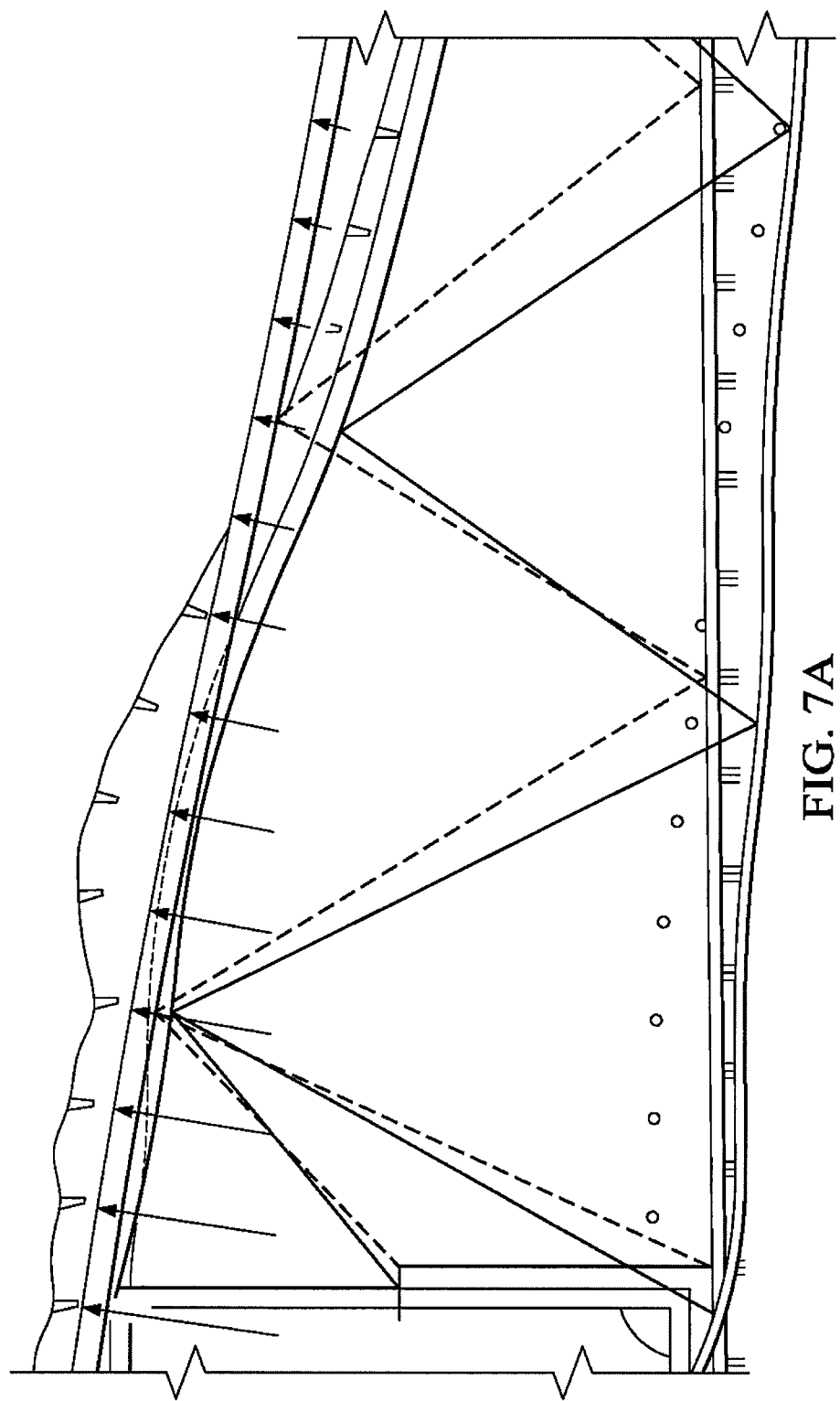
FIG. 7A shows a deflection plot of the structure with the deflections multiplied by a factor of 30 to make them more visible.

The result of attaching these wires 76 is that the deflections 80 of the rib caps 64a, 64b due to air load, represented by deflection arrows 82, are greatly reduced. This reduction in deflections is depicted in FIG. 7, in which the deflections 80 have been multiplied by a factor of 100. FIG. 7 may be compared to FIG. 7A, which shows a deflection plot of the structure with the deflections multiplied by a factor of 30 to make them more visible. As can be seen in FIG. 7A, the cap is bending between the supports at points A and B. The trace of the skin and stringers is shown at the mid-span between the two ribs (Point C). The deflection of the skin is evident. In FIG. 7, for most of the bays 84, the deflection of the cap 64 is imperceptible, with only a slight deflection being evident in the second bay 84a from the leading edge 57 of the airfoil on the upper surface where the air load pressures acting outward are significant. The stiffness added by the wires 76 allows the depth or thickness of the rib cap 64a, 64b to be greatly reduced. In the configuration shown in FIG. 7, the depth of the rib cap 64 and foam stringers has a maximum value of 0.5 inches in the forward portion of the airfoil, and is smaller than that in the aft portion of the airfoil. As will be seen later, the weight savings resulting from using this arrangement are significant. This is because using support members 76 loaded in pure tension or compression is by far a more efficient way to carry loads compared to using support members loaded in bending.

The wires 76 may be designed to carry tension and compression, or they may be designed to carry tension only. If they are designed to carry tension only, it is advantageous to design the rest of the structure so that the wires 76 remain in tension for all load conditions that the airfoil experiences. One way to accomplish this is to construct the rib caps 64 with a certain amount of camber that bows outward. Then, the rib wires 76 are installed with a certain amount of pretension so that the tension in the wires 76 causes the rib cap 64 to be pulled inward. Using engineering analysis tools such as the finite element method, the amount and shape of camber and the degree of tension in each wire 76 can be adjusted so that the final unloaded configuration is the desired location.

In addition, the structure may be designed in a manner described in the previous paragraph, except that it is designed so that the desired shape being designed is not the unloaded shape, but the shape the airfoil will have while it is in the cruise condition in flight.

In some configurations, rib specific or rib wires 76a may be attached to one rib cap 64a and extend to another rib cap 64*b*, such as in the same plane as the web truss members 70, as described below in reference to FIG. 11.

Figure 9:
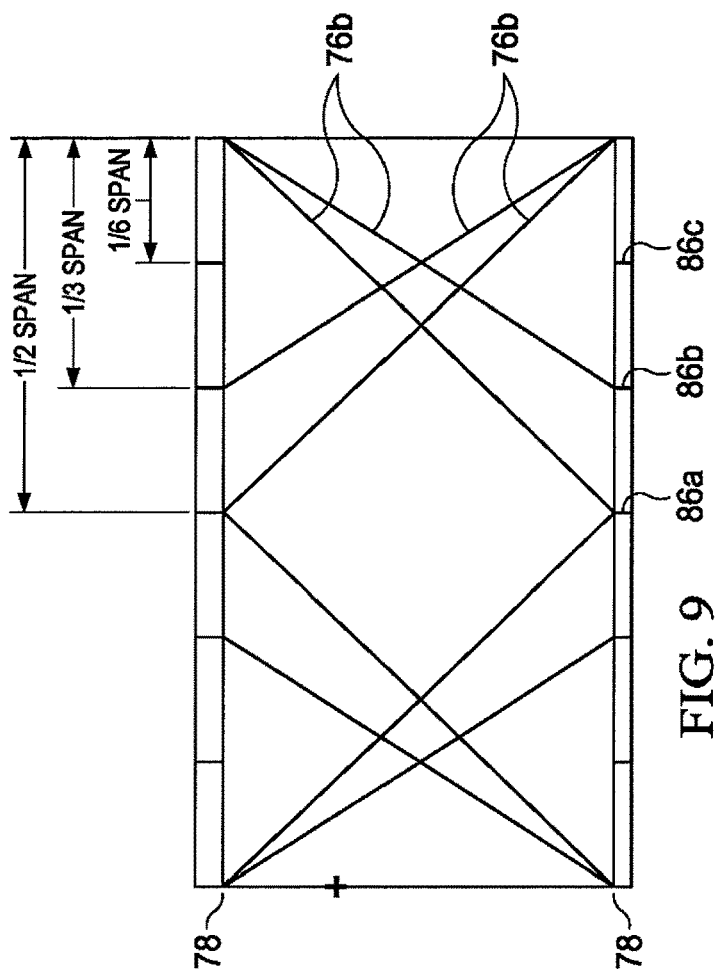
FIG. 9 illustrates the use of skin wires for restraining skin deflections. This embodiment shows the principle used in FIGS. 6 through 8 can be applied in the span-wise direction as well, and inhibits the vertical movement of the skin in bending due to the air load pressure. The skin can be manufactured in an upward cambered shape. Installation of the threads will pull the skin into a flat shape, while placing the threads into a small amount of tension.

The principle of using rib wires 76*a* to more directly carry the air loads from the skin may also be employed for the skin itself, as shown in FIG. 9. In this arrangement, skin support members 76*b*, such as rods, wires, or threads, extend from the same locations from which the rib wires 76*a* extend, but they are attached to various locations 86 on the skin 53. In FIG. 9, the locations are selected to be the mid-span 86*a*, ⅓ span 86*b*, and ⅙ span locations 86*c*, but other locations may be selected. (In FIG. 9, the wires at the ⅙ span location are omitted but it should be noted that a FEM (Finite Element Method) analysis in which these wires were included indicated that the ⅙ span wires made a difference.) In a manner similar to manufacturing the rib cap with a certain amount of camber, the skin can also be manufactured with a certain amount of camber, so that when a certain amount of tension is applied to each wire, the skin is pulled into a desired shape. Just as with the rib wires, a very small diameter thread is all that is required to provide a significant amount of stiffness to the skin.

Figure 10:
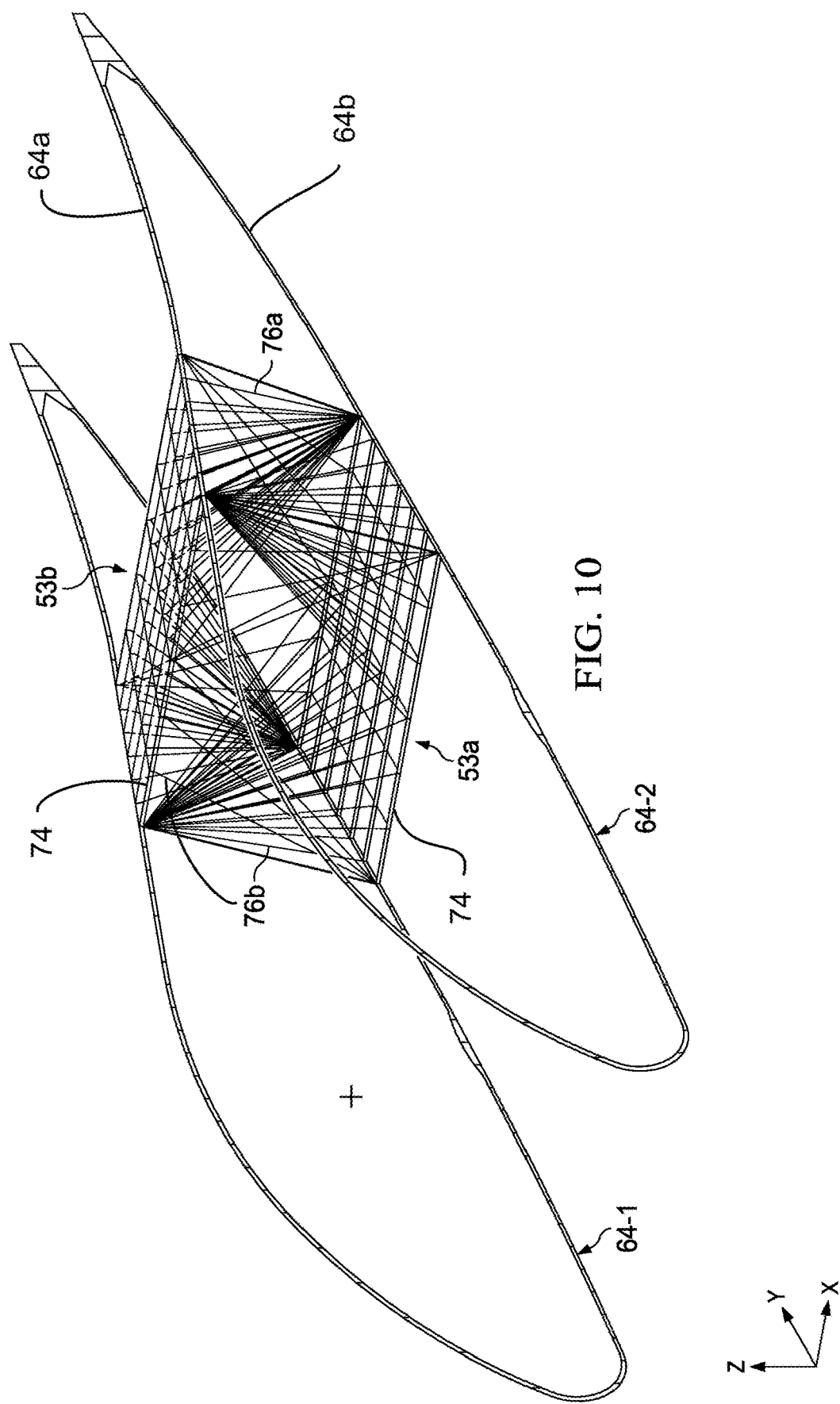
FIGS. 10, 11, and 12 depict the geometry of the configuration of FIGS. 6-9.
Figure 11:
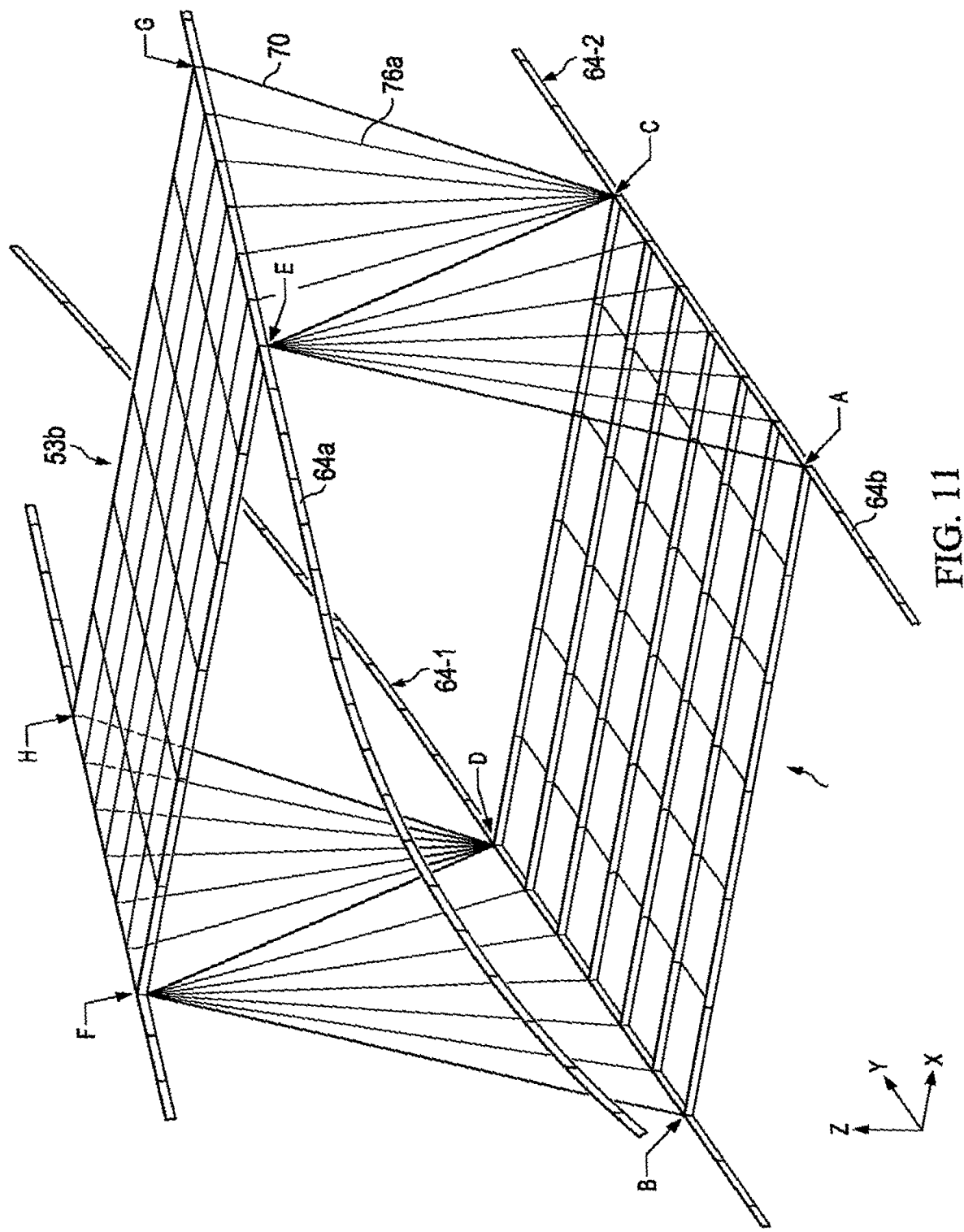
Figure 12:
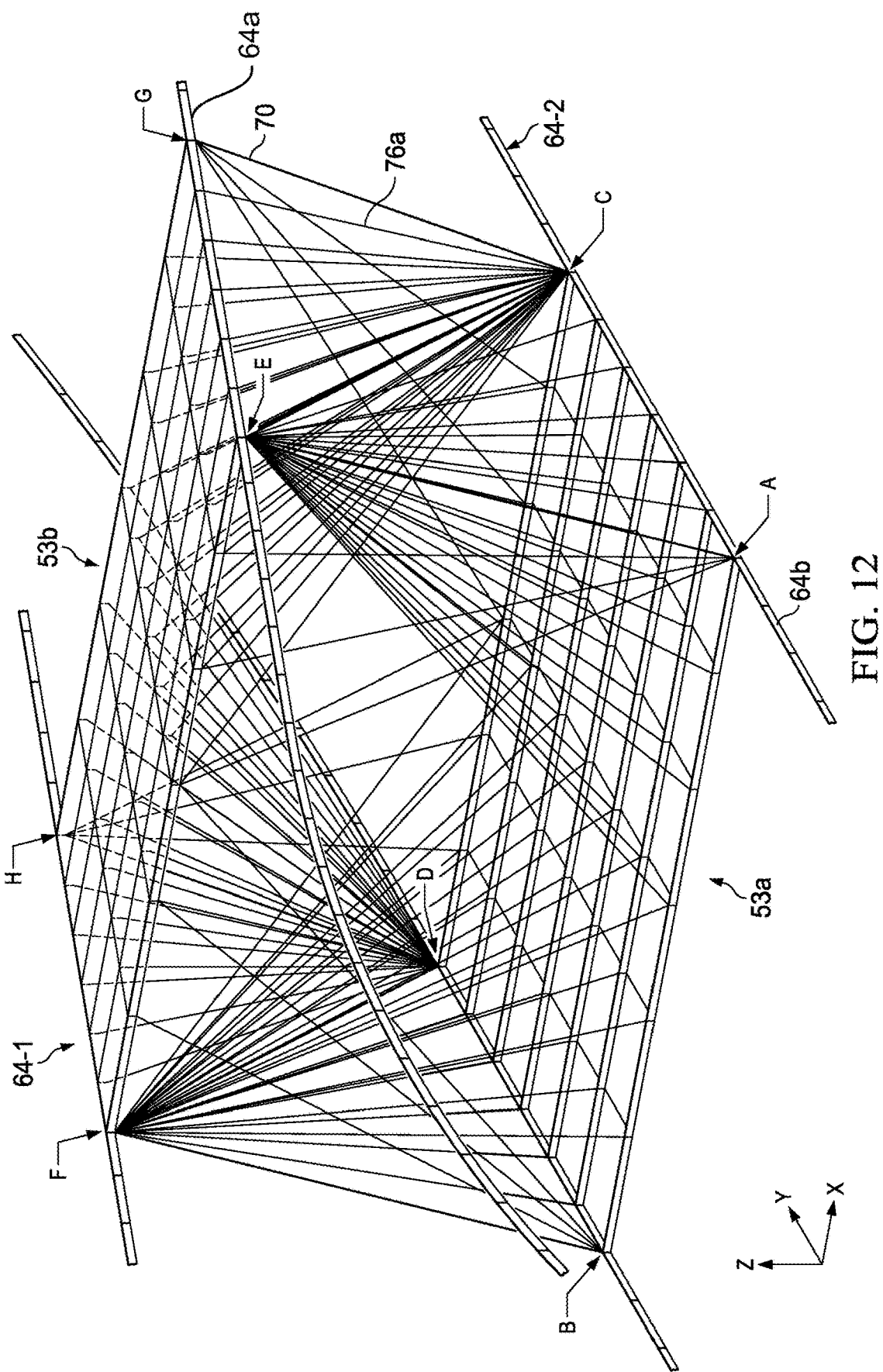

FIGS. 10, 11, and 12 are provided to help the reader visualize the geometry of the configuration by showing two bays of the rib/wing structure only. FIG. 10 provides the context for the two subsequent figures, and shows how they depict the structure for two rib truss bays 84.

FIG. 11 shows the rib wires 76*a* corresponding to the two bays 84 noted in FIG. 10. From Point C extends rib wires 76*a* to the upper cap between Points E and G, and from Point D extends rib wires to the other upper cap between Points F and H. Similarly, from Point E extends rib wires to the lower cap between Points A and C, and from Point F extends rib wires to the other lower cap between Points B and D.

At first glance, FIG. 12 may look confusing. However, when it is explained that each skin wire 76*b* is associated with a rib wire 76*a*, it becomes clear. Thus, for example, the rib wire 76*a* is associated with three skin bracing wires 76*b* (FIG. 10). In addition, the truss web tubes 70 also can have skin wires 76*b* associated with them.

This arrangement of skin wires 76*b* is only one embodiment of this concept, given to illustrate the concept but not to limit the invention to this particular arrangement.

Figure 13:
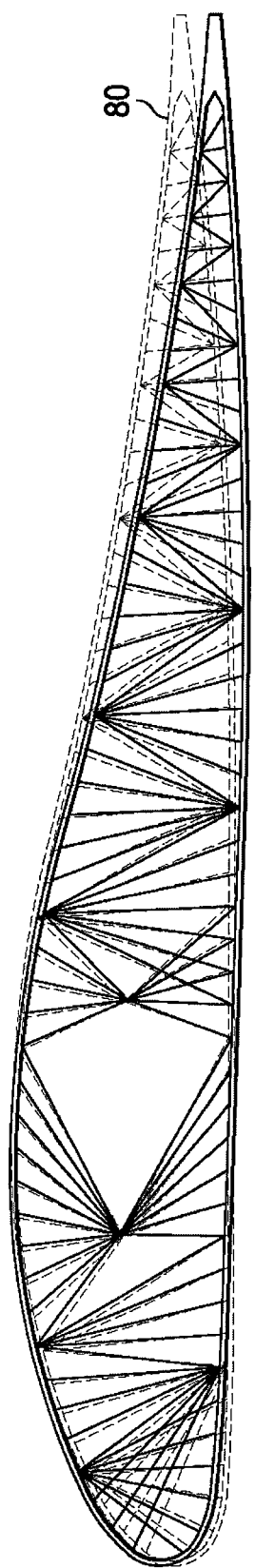
FIG. 13 illustrates deflections for configurations that include rib wires and skin restraining wires. The foam thickness can be adjusted to maintain slope limit under airload. The foam thickness may vary from 0.175 inches to 0.060 inches, depending on the location.

The deflections 80 are shown in FIG. 13. They are quite small, and have been multiplied by a factor of 100 to make them visible.

Figure 14:
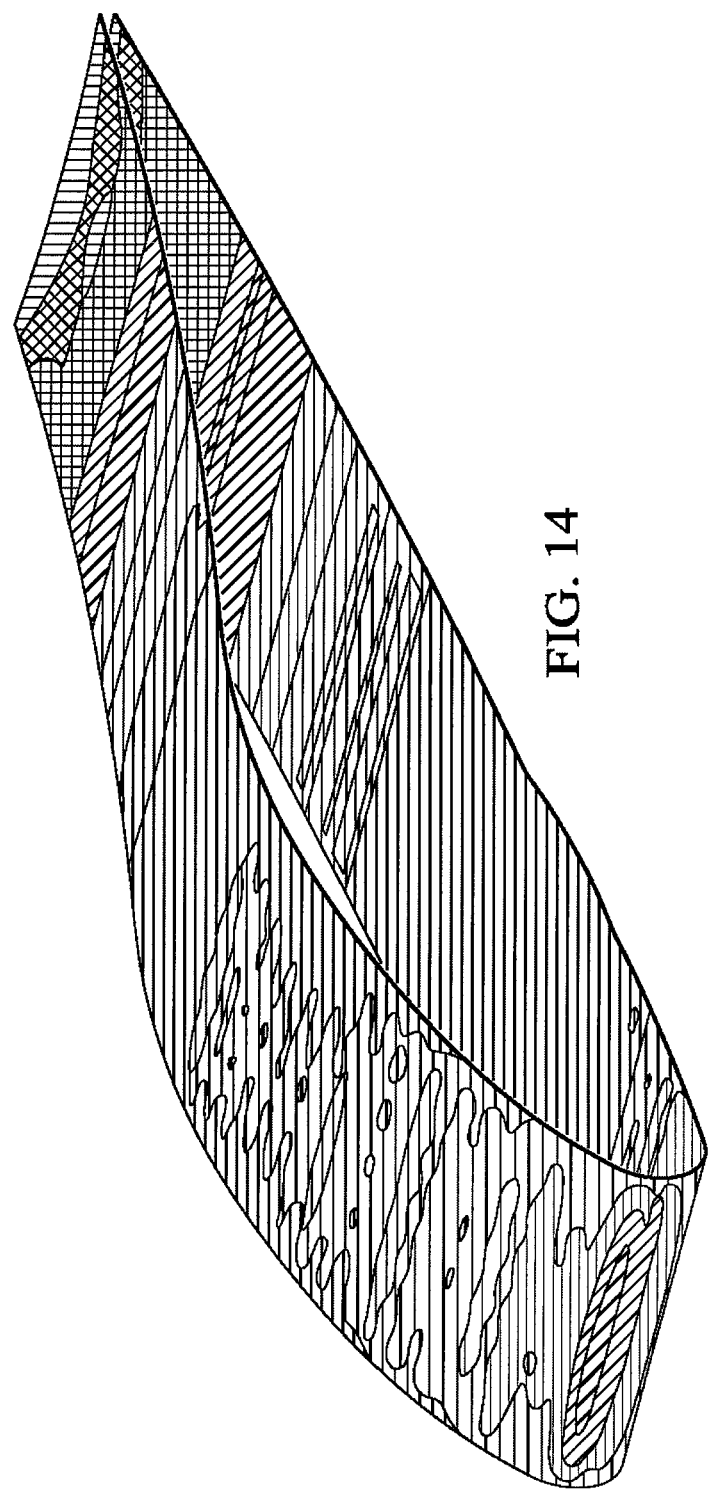
FIG. 14 is a fringe plot of skin deflections.

A fringe plot of the deflections is shown in FIG. 14. As in the side view plot in FIG. 13, in the fringe plot it is evident that the primary source of chord-wise variation in deflections is due to the deflections between the foam stringer ribs, and not that of the foam stringers or the rib caps themselves.

Initially, the configuration of wires shown in FIG. 10 may appear confusing and complex. However, as shown in FIG. 12, the wires 76 follow a regular pattern, with each wire 76*b* attached to the skin 53, 53*b* being related to a wire 76*a* attached to the rib. Manufacturing of such a structure may also initially appear to be a complex problem, but there are feasible ways to efficiently manufacture this structure. The following method is provided as but one method. Those skilled in the art of manufacturing processes will be able to improve upon this method or devise other methods of manufacture that are yet more efficient.

The basic idea of method is to use formed fittings to connect elements together. In the following figures, the formed fittings are labeled "connector 88". The elements joined by the connector are labeled as "rib truss 70", "rigid rods 76", "rib flange 90", "skin 53" and "reinforcement". The following summarizes each of these elements.

The connector 88 is a formed material that joins the other components. The connector 88 serves as an intermediate element between the other components. The connector's surfaces are formed to fit the shape of the other components. The contact area at the junction of the connector 88 and other components is sized to provide sufficient strength when the connector 88 is bonded or otherwise fastened to the other components.

Favorable forms for the connectors 88 are shown in FIGS. 15 through 20. These are shown in relatively rudimentary form. Refinement of the designs may include removal of unnecessary material to reduce weight. A favorable material for the connectors 88 may be a fiber-filled plastic such as glass-filled nylon. This material can be molded in a die.

As described elsewhere in this disclosure, the wing segment 52 consists of ribs 64 at either end of an upper 53*b* and lower skin assembly 53*a*. The ribs 64 consist primarily of a perimeter rib flange 90 and intermediate elements 70 that form a truss shear web for the flange 90. It is a characteristic of a truss that elements join at a "node" so that loads in the rib flange 90 and truss 70 are primarily in tension or compression as opposed to bending or shear. These truss elements 70 may be tubular in form.

As described elsewhere, a key aspect of this disclosure is that "strings" 76 connect the rib truss nodes or intersections 78 to the rib flange 90 and/or the skin 53 and its reinforcement. In one favored embodiment, the strings 76 are not flexible (like string). Instead, they are rigid, small cross section structural elements. One favorable form is cylindrical pultruded carbon fiber rod. This can be made in very small diameter. It is available commercially in diameters as small as 0.010". See: goodwinds.com/carbon/solid-round-.html.

The rib flange 90 is the perimeter of the rib 64. It works in conjunction with the rib truss elements 70 to form a rigid structure that supports the upper 53*b* and lower skins 53*a*. One favorable form for the flange 90 is rectangular cross section carbon-epoxy laminate.

As described elsewhere, the skin 53 and its reinforcements span between two ribs 64-1, 64-2 to form a wing segment. One favorable form for the skin 53 consists of a relatively thin skin that is reinforced with span-wise beams or stringers 74.

The skin's span-wise beams 74 may be reinforced for strength and rigidity with small, strong and rigid elements. One favorable form is a rectangular extrusion. A favorable material for this may be pultruded carbon fiber. This is commercially available in suitable sizes. See: goodwinds.com/carbon/solid-flat.html.

FIG. 15 shows the junction or intersection 78 between the rib flange 90, skin 53, rib truss 70 and rigid rods 76. In the arrangement shown, the rigid rods 76 support only the opposite rib flange 90 and do not reach inboard to the opposite skin 53. The connector 88 is bonded to the rib flange 90. The tubular rib truss elements 70 fit in corresponding holes 92 in the connector 80 and are bonded to the connector 88. The rigid rods 76 also fit into holes 92 in the connector 88 and are similarly bonded to the connector 88.

FIG. 16 shows a cross section through a connector 88 that connects a single rigid rod 76 to the reinforcement 74 and skin 53 at the interior of the skin. This figure corresponds approximately to FIGS. 19A and 19B, which show a two-view without the cross section (but with the addition of an optional blade 94). Note that in this concept the connector fits around the reinforcement. Also, the connector 88 fits within a pocket formed in the skin beam.

FIGS. 17A and 17B are a two-view of the connector 88 also shown in FIG. 15. The skin is omitted in this view. This figure shows that the truss 70 and rod elements 76 fit within pockets formed in the connector 88. The connector 88 is bonded to the rib flange 90 on one side and to the skin 53 on the opposite side.

FIGS. 18A and 18B show a two-view of a connector 88 similar to that of FIGS. 17A and 17B. In this case, the connector 88 also connects rods 76 to skin connectors in the interior of the skin panel. Again, the truss 70 and rod elements 76 are bonded into corresponding pockets formed in the connector 88. The connector is bonded to the rib flange 90 and, on the opposite side, to the skin 53.

FIGS. 19A and 19B correspond to the cross section shown in FIG. 16. This particular connector 88 features an optional "blade 94" that increases the bond-line area between the connector 88 and skin beam.

FIGS. 20A and 20B correspond to FIGS. 19A and 19B except that they omit the blade 94 and, more importantly, are canted in angle to line up with a rib node 78 that is ahead or behind the particular location of the connector 88.

One embodiment of the manufacturing process of the wing segment is pertinent to the integration of the "strings" 76. In this process, rigid rods 76 are assumed to be used in place of flexible string. It is also assumed that the rigid rods 76 are used to reinforce both the rib 64 and the skins 53a, 53b.

One example sequence for assembling the ribs comprises the following. The rib flange 90 is placed in tooling to insure correct geometry. A first connector 88 is bonded to the rib flange 90 at the correct location. A first truss element 70 is coated with glue and inserted into the first connector 88. The opposite end of the truss element 70 is coated with glue and a second connector 88 is slipped over the truss element 70 and is then bonded to the rib flange 90. This process continues until all truss elements 70 and connectors 88 are bonded into a single unit.

An example embodiment of the rib to skin assembly is as follows. A first skin 53 is formed and placed in a female tool so that the beams project upward. Specific pockets are formed in the skin beam to receive the skin connectors. Skin connectors are strung over and bonded to the skin reinforcement elements 74 in the correct locations. The reinforcement with skin connectors are bonded into the skin beam. This is repeated for all skin reinforcements and skin connectors. The assembled rib 64-1 is located in the female tool and is bonded to the first skin edge. A second completed rib 64-2 is located in the tool and bonded to the opposite skin edge. Now we are ready to integrate the rigid rods.

An example embodiment of the first rigid rod assembly follows. Although the rods 76 are rigid, they are also very slender (i.e. 0.010" to 0.030" in diameter). This permits them to be flexed and buckled during the assembly process. This is a crucial detail. Each rod 76 is cut to the precise length needed, minus a small tolerance that insures that the rod is not under compression or buckled when assembled into the connectors 88. Each end of the first rod 76 is coated with glue. A first end is inserted in a first connector's first hole 92. The rod 76 is then flexed to permit insertion of the second end into a second connector's first hole 92. The natural rigidity of the rod 76 causes it to straighten once insertion is complete. This completes the assembly of the first rod. This process is repeated for all corresponding connector holes 92.

For example, a second skin 53 is placed in a female tool so that its beams project upward. Specific pockets are formed in the skin beam to receive the skin connectors. Skin connectors are strung over and bonded to the skin reinforcement elements in the correct locations. The reinforcement 74 with skin connectors are bonded into the skin beam. This is repeated for all skin reinforcements 74 and skin connectors. The completed rib-skin-rib assembly is positioned above the second skin assembly. The rib flanges 90 are bonded to the second skin 53. The first skin 53 is bonded to the second skin 53 at the leading and trailing edges.

An example embodiment of the second rigid rod assembly is as follows. Rigid rods 76 are now assembled between corresponding connector holes 92 using the same process as described above. This concludes the description of the assembly process relevant to the "strings" 76.

This section describes an alternate manufacturing process of the wing segment 52 pertinent to the integration of the "strings" 76. In this process, the "strings" 76 are actually flexible strings. The strings 76 that attach to the skin side have a portion at the end where the string 53 is attached to the skin 53.

The skin panel (53) is fabricated such that it has a slight bow outward, so that the skin 53 bows slightly away from the interior of the wing cross section in the center of the segment when it is not loaded. The strings 76 are then fastened to connectors 88 as described above. The other side of the each string 76 is passed through an orifice on the node 78 that makes up the rib truss 70. These strings 76 are connected to a machine that can adjust the tension or length of each string 76 individually.

Then, an appropriate amount of tension or motion is applied to each string 76 such that the shape of the airfoil is pulled into the desired shape, which may be flat in the span-wise direction. The amount of tension or change in length can be pre-calculated using finite element analysis, and can also be monitored in real-time by sensing of the location of the skin surface. These measurements can be used as part of a feedback loop to enable a near-perfect skin profile.

This design has the advantage over the design described in Section 3.7 in that the flexible strings 76 can be made of much smaller diameter compared to the tubes that can carry compression, and thus be lighter than the tubes. However, the amount of tension is preferably sufficient such that positive pressures on the wing surface do not result in the strings 76 becoming slack when the tension is reduced due to the positive pressure.

It is possible that a hybrid approach may be advantageous. Since the upper skin 53b has negative pressure over most of its surface, flexible strings 76 may be used for most or all of the string elements 76. Since the lower skin 53a has positive pressure over most of its surface, tubes 76 may be utilized to carry the compression loads from the skin 53 to the opposite node 78.

In configurations described that primarily use bending as the means to transfer the air load to the ribs, the deflections are quite sensitive to the location of the rib supports. If as shown in FIGS. 21A, 21B, 21C, and 21D, the support locations are located too far inboard, the beam ends will sag down. If, as shown in FIGS. 22A, 22B, 22C, and 22D, the support locations are located too close to the ends of the beam, the middle will sag. If, as shown in FIGS. 23A, 23B, 23C, and 23D, known as the 2-5-2 concept, the supports are placed at a certain location, the deflections are surprisingly small.

In the illustrative embodiment, the skin is not nearly so sensitive to support locations because the axial load path is so stiff compared to the bending load path. However, arranging the ribs such that skin is support on both sides of the rib may have an incremental advantage in that it may lessen the magnitude of the tension forces in the skin threads.

If an aft portion 96 of the wing 52 includes wires 76c made of shape-memory alloys, they may be used to change the shape of a trailing edge 98 of the wing 52 such that it can function as a control surface. This option is shown in FIGS. 24 and 24A. Such a system would be lighter, simpler, more reliable, and cheaper to manufacture than a comparable actuator-hinge mechanism. It may also have an aerodynamic improvement because it will eliminate abrupt surface discontinuities associated with the hinge.

Benefits of this invention include reduced weight while satisfying the aero-smoothness requirements for a solar-powered airplane. An example of the weight savings is given in FIG. 25. For a solar-powered airplane containing up to 100 wing segments such as pictured in FIG. 25, the weight savings can be in the hundreds of pounds. This amount of weight savings is especially significant for a solar-powered airplane.

Systems and methods embodied herein may be employed during any one or more of the stages of production and service. For example, components or subassemblies corresponding to production process may be fabricated or manufactured in a manner similar to components or subassemblies produced while the aircraft is in service. Also, one or more apparatus embodiments, method embodiments, or a combination thereof may be utilized during the production stages, for example, by substantially expediting assembly of or reducing the cost of an aircraft. Similarly, one or more of apparatus embodiments, method embodiments, or a combination thereof may be utilized while the aircraft is in service, for example and without limitation, to maintenance and service.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. A stiffened wing airfoil including at least one wing segment of a plurality of wing segments together comprising the wing airfoil, each wing segment rotatable about a longitudinal axis of the wing airfoil, the wing segment comprising:
 a first skin assembly and a second skin assembly, wherein each of the first skin assembly and second skin assemblies incorporates a plurality of inwardly facing stringers extending in a direction of the longitudinal axis of the wing airfoil and conforming to an inner surface of the first skin assembly and the second skin assembly, each of the stringers comprising a groove;
 a first rib at a distal end of the wing segment and a second rib at a proximal end of the wing segment, wherein the first rib and second rib are supported by a plurality of rib trusses extending between a first rib cap and a second rib cap of each of the first rib and the second rib at nodes proximate a first subset of the stringers; and
 a plurality of support members including a plurality of rib support members (76a) and a plurality of skin support members (76b), wherein:
  each of the rib support members extend between the first rib cap and the second rib cap of the first rib from one of the nodes proximate the first subset of stringers to a node proximate a stringer other than the first subset of the stringers;
  each of the skin support members extend from the second rib cap of the first rib at one of the nodes proximate the first subset of stringers to one of a series of predefined locations along the groove of one of the plurality of stringers on the first skin assembly, wherein a plurality of the skin support members comprise wires or rods;
  at least one of the skin support members extends from the second rib cap of the first rib at the one of the nodes proximate the first subset of stringers to a predefined location along a groove of a stringer other than the first subset of stringers; and
  at least one of the plurality of skin support members is affixed between the one of the plurality of inwardly facing stringers and a rib flange of one of the first rib and the second rib, the rib flange substantially perpendicular to the longitudinal axis of the wing airfoil.

2. The stiffened wing airfoil of claim 1, wherein the one of the predefined locations is along a same groove of the first subset of stringers.

3. The stiffened wing airfoil of claim 2, wherein the series of predefined locations are evenly spaced between the first rib and second rib.

4. The stiffened wing airfoil of claim 1, wherein at least one of the second skin assembly and the first skin assembly bows away from the other of the second skin assembly and the first skin assembly.

5. The stiffened wing airfoil of claim 4, wherein the at least one of the first skin assembly and the second skin assembly is pulled inward by tension supplied by at least some of the support members.

6. The stiffened wing airfoil of claim 1, wherein the support members extending from the inwardly facing stringers of the second skin assembly to the first skin assembly comprise wires, and wherein the support members extending from the inwardly facing stringer grooves of the first skin assembly to the second skin assembly comprise rods.

7. The stiffened wing airfoil of claim 1, wherein a group of the plurality of support members contact the inwardly facing stringers of the first skin assembly and the second skin assembly via a connector in contact with the rib flange of one of the first rib or the second rib.

8. The stiffened wing airfoil of claim 7, wherein at least one of the plurality of rib trusses is mounted to the connector.

9. The stiffened wing airfoil of claim 7, wherein a blade of the connector contacts one of the first skin assembly and the second skin assembly.

10. The stiffened wing airfoil of claim 1, further comprising: a solar panel located on the first skin assembly opposite the inwardly facing stringers.

11. The stiffened wing airfoil of claim 1, wherein a portion of the plurality of support members attached to an aft portion of one of the first skin assembly and the second skin assembly comprise shape-memory alloy, wherein the portion of support members controls a shape of a trailing edge of at least one of the first skin assembly and the second skin assembly.

12. The stiffened wing airfoil of claim 1, wherein the skin support members are secured to the groove of the stringer at the series of predefined locations via a plurality of connectors, formed to the grooves of the stringers.

13. The stiffened wing airfoil of claim 1, wherein the stringers are integrally formed from the same material as the respective first and second skin assemblies.

14. The stiffened wing airfoil of claim 1, wherein the at least one of the plurality of skin support members is affixed between one of the plurality of inwardly facing stringer and a rib flange of one of the first rib and the second rib via a connector having a surface bonded to a matching surface of the rib flange of the one of the first rib and the second rib.

15. The stiffened wing airfoil of claim 14, wherein at least one of the rib support members is affixed between the first rib cap and the second rib cap via the connector.

16. The stiffened wing airfoil of claim 15, wherein the at least one of the plurality of skin support members and the at least one of the plurality of rib support members is inserted into a corresponding hole of the connector and bonded to the connector.

* * * * *